US012679924B2

(12) United States Patent
Tsushima et al.

(10) Patent No.: US 12,679,924 B2
(45) Date of Patent: Jul. 14, 2026

(54) EPOXY RESIN AND ELECTRODEPOSITION PAINT

(71) Applicant: KANSAI PAINT CO., LTD., Amagasaki (JP)

(72) Inventors: Shinji Tsushima, Hiratsuka (JP); Noriyuki Yamada, Hiratsuka (JP); Takashi Iwai, Hiratsuka (JP)

(73) Assignee: KANSAI PAINT CO., LTD., Amagasaki (JP)

( * ) Notice: Subject to any disclaimer, the term of this patent is extended or adjusted under 35 U.S.C. 154(b) by 0 days.

(21) Appl. No.: 17/913,376

(22) PCT Filed: Mar. 23, 2021

(86) PCT No.: PCT/JP2021/011996

§ 371 (c)(1),
(2) Date: Sep. 21, 2022

(87) PCT Pub. No.: WO2021/193635

PCT Pub. Date: Sep. 30, 2021

(65) Prior Publication Data

US 2023/0134156 A1 May 4, 2023

(30) Foreign Application Priority Data

Mar. 27, 2020 (JP) ................................ 2020-058196
Nov. 20, 2020 (JP) ................................ 2020-193682

(51) Int. Cl.
*C08G 59/24* (2006.01)
*C08G 59/14* (2006.01)
*C08G 59/68* (2006.01)
*C09D 5/44* (2006.01)

(52) U.S. Cl.
CPC ....... *C08G 59/245* (2013.01); *C08G 59/1477* (2013.01); *C08G 59/686* (2013.01); *C09D 5/4438* (2013.01); *C09D 5/4453* (2013.01)

(58) Field of Classification Search
None
See application file for complete search history.

(56) References Cited

U.S. PATENT DOCUMENTS 4,401,499 A 8/1983 Kaneko et al.
5,407,748 A * 4/1995 Fujibayahsi ........... C08G 65/14 523/404
5,744,521 A * 4/1998 Takasaki ................ C08G 18/58 523/415
2010/0167071 A1* 7/2010 Chouai ................ C09D 5/4449 524/413
2010/0237292 A1 9/2010 Gan et al.
2016/0208133 A1* 7/2016 Yamaguchi .......... C08G 59/066

FOREIGN PATENT DOCUMENTS

| | | | |
|---|---|---|---|
| CN | 104628995 | A | 5/2015 |
| CN | 106318114 | A | 1/2017 |
| JP | S606721 | A | 1/1985 |
| JP | H0616994 | A | 1/1994 |
| JP | H07126557 | A | 5/1995 |
| JP | H08134176 | A | 5/1996 |
| JP | 2001279168 | A | 10/2001 |
| JP | 2002201410 | A | 7/2002 |
| JP | 2010540754 | A | 7/2011 |
| JP | 2016017098 | A | 2/2016 |
| JP | 2016135848 | A | 7/2016 |
| JP | 2018100373 | A | 6/2018 |
| JP | 2018162362 | A | 10/2018 |

OTHER PUBLICATIONS

International Search Report (ISR) mailed Jun. 1, 2021, issued for International application No. PCT/JP2021/011996. (3 pages).
International Preliminary Report on Patentability, dated Sep. 22, 2022, for corresponding international application PCT/JP2021/011996 (1 page).
Notification Concerning Transmittal of International Preliminary Report on Patentability, mailed Oct. 6, 2022, for corresponding international application PCT/JP2021/011996 (1 page).
Notification of Transmittal of Translation of the International Preliminary Report on Patentability, mailed Oct. 6, 2022, for corresponding international application PCT/JP2021/011996 (1 page).
Written Opinion of the International Searching Authority, mailed Jun. 1, 2021, for corresponding international application PCT/JP2021/011996 (7 page).
Extended European Search Report (EESR) dated Jul. 11, 2024, issued for European counterpart patent application No. EP21774010.9 (7 pages).

* cited by examiner

*Primary Examiner* — Megan Mcculley
(74) *Attorney, Agent, or Firm* — Law Office of Katsuhiro Arai

(57) ABSTRACT

An epoxy resin, which is obtained by reacting at least a compound having one or more epoxy groups and a compound having a functional group that reacts with the epoxy groups, satisfies conditions (I) and/or (II): (I) the compound having a functional group that reacts with the epoxy groups includes a trihydric or higher phenol compound and/or a compound including a trifunctional or higher polyisocyanate; (II) the epoxy resin has an average degree of polyfunctionalization (X1) per molecule, as expressed by Formula (1), of 0.30 or more:

Average degree of polyfunctionalization ($X1$)=number of ends per molecule of epoxy resin−2. Formula (1):

18 Claims, No Drawings

EPOXY RESIN AND ELECTRODEPOSITION PAINT

CROSS-REFERENCE TO RELATED APPLICATIONS

This application is the U.S. National Phase under 35 U.S.C. § 371 of International Application PCT/JP2021/011996, filed Mar. 23, 2021, which claims priority to Japanese Patent Application No. JP2020-058196 2020 Mar. 27, filed Mar. 27, 2020 and No. JP2020-193682, filed Nov. 20, 2020. The International Application was published under PCT Article 21(2) in a language other than English.

TECHNICAL FIELD

The present invention relates to an epoxy resin and an electrodeposition paint. In particular, the present invention relates to an epoxy resin obtained by reaction of specific components, an epoxy resin having specific properties, an aqueous resin dispersion including any one of the epoxy resins or a modified product thereof dispersed in an aqueous medium, an amino-containing epoxy resin obtained by reacting any one of the epoxy resins and an amine compound, and an electrodeposition paint containing the amino-containing epoxy resin.

BACKGROUND ART

Epoxy resins are excellent in properties such as mechanical strength, adhesion, and chemical resistance and are widely used as coating film-forming resins for paints.

Among paints, electrodeposition paints have high coating efficiency and form coating films with good corrosion resistance, and thus are widely used for coating of metallic products (e.g., automotive parts, electrical appliance parts, and other industrial appliances) which are required to have these properties.

An electrodeposition paint is provided in the form of a solution or dispersion of a coating film-forming resin, which is a cationic resin (e.g., an amino-containing epoxy resin) or an anionic resin (e.g., a carboxyl-containing resin), a curing agent (e.g., a blocked polyisocyanate compound), and a curing catalyst in an aqueous medium. Using this paint composition as a coating bath, electricity is applied with a coating target as a cathode or an anode to form a deposited coating film on the coating target, and the deposited coating film is then heated to thereby form a crosslinking-cured coating film.

In electrodeposition paints, organotin compounds have been generally used as curing catalysts for promoting cross-linking reactions. However, organotin compounds, while having very high catalytic performance, have problems in terms of safety and environmental impact, and their use may be restricted. Accordingly, alternative catalysts to organotin compounds have been demanded. Although it has been studied to use bismuth compounds, zinc compounds, and the like as the alternatives, they have disadvantages such as high cost, insufficient catalytic effect, and instability in paints.

In addition, when an organotin compound catalyst is used, it is necessary to enhance the curing performance as much as possible.

Typically, the formation of a coating film by crosslinking curing is performed by heating at 160° C. or higher. However, depending on the conditions of a drying furnace, the shape of a coating target, etc., some parts are baked at a temperature lower than the target temperature. Furthermore, it has been required to perform low-temperature baking at low temperature (80° C. to 160° C., preferably 80° C. to 130° C.) for the purpose of energy cost reduction.

To perform baking at low temperature, low-temperature curable blocked polyisocyanate compounds have been generally used as curing agents. However, an electrodeposition paint having increased low-temperature reactivity has insufficient long-term storage stability (bath stability), which may result in a coating film poor in finished quality, corrosion resistance, etc.

PTL 1 discloses polyfunctionalized epoxy resins. However, these epoxy resins are not used in electrodeposition paints. In addition, curability, particularly curability at the time when a low-activity catalyst is used, and paint storage stability have not been discussed.

PTLs 2 and 3 disclose electrodeposition paints each including an amine-modified epoxy resin obtained by amine modification of an epoxy resin modified with a caprolactone adduct or a phenol compound. However, also for these electrodeposition paints, curing properties, particularly low-temperature curability, and paint storage stability have not been discussed.

CITATION LIST

Patent Literature

PTL 1: Chinese Patent Application Publication No. 104628995

PTL 2: Japanese Unexamined Patent Application Publication No. 2016-135848

PTL 3: Japanese Unexamined Patent Application Publication No. 2001-279168

SUMMARY OF INVENTION

Technical Problem

An object of the present invention is to provide an epoxy resin excellent in curability at the time when a low-activity catalyst is used and at low temperature and storage stability and excellent in coating film finished quality and corrosion resistance when constituting a paint. Another object is to provide an aqueous resin dispersion including the epoxy resin or a modified product thereof dispersed in an aqueous medium, an amino-containing epoxy resin obtained by reacting the epoxy resin and an amine compound, and a cationic electrodeposition paint containing the amino-containing epoxy resin.

Solution to Problem

As a result of intensive studies to solve the above problems, the present inventors have found that the above problems can be solved by an epoxy resin obtained by reaction of specific components, an epoxy resin having specific properties, an aqueous resin dispersion including any one of the epoxy resins or a modified product thereof dispersed in an aqueous medium, an amino-containing epoxy resin obtained by reacting any one of the epoxy resins and an amine compound, and a cationic electrodeposition paint containing the amino-containing epoxy resin, thereby completing the present invention.

Specifically, the present invention is as follows.

Item 1: An epoxy resin obtained by reacting at least a compound having one or more epoxy groups, and a compound having a functional group that reacts with the epoxy groups, in which the epoxy resin satisfies conditions (I) and/or (II) below:

(I) the compound having a functional group that reacts with the epoxy groups includes a trihydric or higher phenol compound and/or a compound including a trifunctional or higher polyisocyanate, (II) the epoxy resin has an average degree of polyfunctionalization (X1) per molecule, as expressed by Formula (1) below, of 0.30 or more, Average degree of polyfunctionalization (X1)=number of ends per molecule of epoxy resin−2. Formula (1):

Item 2: The epoxy resin according to Item 1, the epoxy resin being obtained by reacting at least a compound having one or more epoxy groups, and a compound having a functional group that reacts with the epoxy groups, in which the epoxy resin has an average degree of polyfunctionalization (X1), as expressed by Formula (1) below, of 0.30 or more, Average degree of polyfunctionalization ($X1$)=number of ends per molecule of epoxy resin−2, and Formula (1):

the epoxy resin has an average concentration of polyfunctionalization (Y1), as expressed by Formula (2) below, of 0.10 or more, Average concentration of polyfunctionalization ($Y1$)=average degree of polyfunctionalization ($X1$) of epoxy resin÷weight-average molecular weight Mw of epoxy resin×1000. Formula (2):

Item 3: The epoxy resin according to Item 1 or 2, in which the trihydric or higher phenol compound includes a compound represented by structural formula (A) below:

[Chem. 1]

(A)

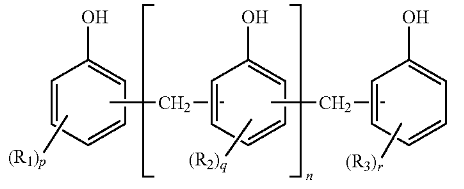

(where n is an integer of 1 to 20, p is an integer of 0 to 4, q is an integer of 0 to 3, and r is an integer of 0 to 4; $R_1$ to $R_3$ are each independently a monovalent group; $R_2$'s in n repeating units may be different from each other; when a plurality of $R_1$'s, $R_2$'s, and/or $R_3$'s are present in aromatic rings, the plurality of $R_1$'s, $R_2$'s, and/or $R_3$'s may be the same or different from each other; and $R_1$ to $R_3$ may be bonded to each other to form a ring).

Item 4: The epoxy resin according to any one of Items 1 to 3, obtained by further reacting a compound having one or more active hydrogens in one molecule that is other than the trihydric or higher phenol compound.

Item 5: The epoxy resin according to any one of Items 1 to 4, the epoxy resin being obtained by reacting, together with the trihydric or higher phenol compound, a compound represented by structural formula (B) below:

[Chem. 2]

(B)

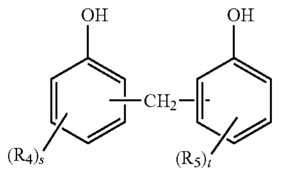

(where s is an integer of 0 to 4, and t is an integer of 0 to 4; $R_4$ and $R_5$ are each independently a monovalent group; when a plurality of $R_4$'s and/or $R_5$'s are present in aromatic rings, the plurality of $R_4$'s and/or $R_5$'s may be the same or different from each other; and $R_4$ and/or $R_5$ may be bonded to each other to form a ring), in which a content ratio (mass ratio) of the trihydric or higher phenol compound to the compound represented by structural formula (B) is in a range of 1/99 to 99/1.

Item 6: The epoxy resin according to any one of Items 1 to 5, in which the trifunctional or higher polyisocyanate includes isocyanurate-type isocyanate and/or crude MDI.

Item 7: An amino-containing epoxy resin obtained by reacting the epoxy resin according to any one of Items 1 to 6 and an amine compound.

Item 8: An aqueous resin dispersion including the epoxy resin according to any one of Items 1 to 6 or a modified product of the epoxy resin dispersed in an aqueous medium.

Item 9: An anionic electrodeposition paint containing the epoxy resin according to any one of Items 1 to 6 or a modified product of the epoxy resin, and a curing agent.

Item 10: A cationic electrodeposition paint containing the amino-containing epoxy resin according to Item 7, and a curing agent.

Item 11: A single-layer type cationic electrodeposition paint containing the amino-containing epoxy resin according to Item 7, and a curing agent.

Item 12: A single-layer type cationic electrodeposition paint containing:

the epoxy resin according to any one of Items 1 to 6 obtained by reacting at least a compound having one or more epoxy groups, a trihydric or higher phenol compound and/or a compound including a trifunctional or higher polyisocyanate, and an amine compound; and a curing agent, in which the trihydric or higher phenol compound is a compound represented by structural formula (A) below:

[Chem. 3]

(A)

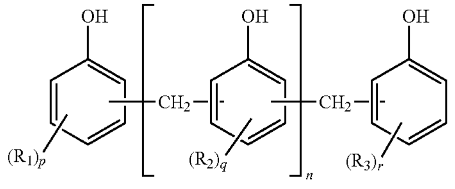

(where n is an integer of 1 to 20, p is an integer of 0 to 4, q is an integer of 0 to 3, and r is an integer of 0 to 4; $R_1$ to $R_3$ are each independently a monovalent group; $R_2$'s in n repeating units may be different from each other; when a plurality of $R_1$'s, $R_2$'s, and/or $R_3$'s are present in aromatic rings, the plurality of $R_1$'s, $R_2$'s, and/or $R_3$'s may be the same or different from each other; and $R_1$ to $R_3$ may be bonded to each other to form a ring).

Item 13: A cationic electrodeposition paint containing:

the epoxy resin according to any one of Items 1 to 6 obtained by reacting at least a compound having one or more epoxy groups, a trihydric or higher phenol compound and/or a compound including a trifunctional or higher polyisocyanate, and an amine compound; and a curing agent, in which the trihydric or higher phenol compound is a compound represented by structural formula (A) below:

[Chem. 4]

(A)

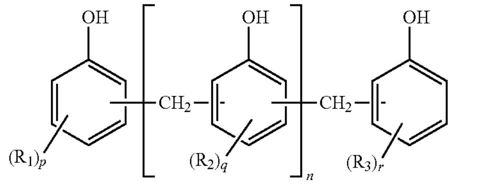

(where n is an integer of 1 to 20, p is an integer of 0 to 4, q is an integer of 0 to 3, and r is an integer of 0 to 4; $R_1$ to $R_3$ are each independently a monovalent group; $R_2$'s in n repeating units may be different from each other; when a plurality of $R_1$'s, $R_2$'s, and/or $R_3$'s are present in aromatic rings, the plurality of $R_1$'s, $R_2$'s, and/or $R_3$'s may be the same or different from each other; and $R_1$ to $R_3$ may be bonded to each other to form a ring), and a content of the amino-containing epoxy resin is 71 mass % or more based on 100 mass % of resin components other than the curing agent.

Item 14: The cationic electrodeposition paint according to any one of Items 10 to 13, in which the compound having one or more epoxy groups is a compound not modified with amine.

Item 15: The cationic electrodeposition paint according to any one of Items 12 to 14, in which the epoxy resin is obtained by reacting at least a compound having one or more epoxy groups, a compound including a trihydric or higher phenol compound, and a compound having one or more active hydrogens in one molecule that is other than the trihydric or higher phenol compound.

Item 16: The cationic electrodeposition paint according to Item 15, in which the compound having one or more active hydrogens in one molecule that is other than the trihydric or higher phenol compound is a compound represented by structural formula (B) below:

[Chem. 5]

(B)

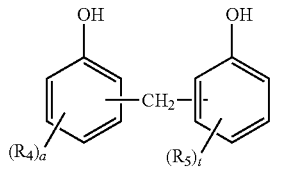

(where s is an integer of 0 to 4, and t is an integer of 0 to 4; $R_4$ and $R_5$ are each independently a monovalent group; when a plurality of $R_4$'s and/or $R_5$'s are present in aromatic rings, the plurality of $R_4$'s and/or $R_5$'s may be the same or different from each other; and $R_4$ and/or $R_5$ may be bonded to each other to form a ring), and a content ratio (mass ratio) of the trihydric or higher phenol compound to the compound represented by structural formula (B) is in a range of 1/99 to 99/1.

Item 17: The cationic electrodeposition paint according to any one of Items 12 to 14, in which the trifunctional or higher polyisocyanate includes isocyanurate-type isocyanate and/or crude MDI.

Item 18: The cationic electrodeposition paint according to any one of Items 10 to 17, further containing an acrylic resin, in which a content of the acrylic resin is less than 30 mass % based on a total amount of all the epoxy resin and the acrylic resin taken as 100 mass %, and an absolute value of a difference in SP value between the acrylic resin and the epoxy resin is less than 1.0.

Item 19: A method for producing the cationic electrodeposition paint according to any one of Items 10 to 18, the method including:

a step of producing an amino-containing epoxy resin by reacting an amine compound with an epoxy resin obtained by reacting at least a compound having one or more epoxy groups and a trihydric or higher phenol compound and/or a compound including a trifunctional or higher polyisocyanate, the trihydric or higher phenol compound being not a xylene formaldehyde resin; and a step of mixing the amino-containing epoxy resin and a curing agent to produce a cationic electrodeposition paint.

Item 20: The method for producing the cationic electrodeposition paint according to Item 19, in which the compound having one or more epoxy groups is a compound not modified with amine, and the cationic electrodeposition paint to be produced is a single-layer type cationic electrodeposition paint.

Item 21: A painted article obtained by immersing a coating target in an electrodeposition paint bath containing the cationic electrodeposition paint according to any one of Items 10 to 18 and performing electrodeposition.

Advantageous Effects of Invention

The epoxy resin of the present invention is excellent in curability at the time when a low-activity catalyst is used and at low temperature and storage stability and excellent in coating film finished quality and corrosion resistance when constituting a paint.

Furthermore, the aqueous resin dispersion and the electrodeposition paint of the present invention are excellent in curability at the time when a low-activity catalyst is used and at low temperature, storage stability, coating film finished quality, and corrosion resistance.

DESCRIPTION OF EMBODIMENTS

In the present invention, an "epoxy resin" refers to both a resin having an epoxy group and a resin resulting from the reaction between the epoxy group of the epoxy resin and another functional group-containing compound, and need not necessarily contain an epoxy group. "Epoxy" may be abbreviated as "EP".

In the present invention, "polyfunctional" means that the number of functional groups is greater than 2. However, in the present invention, if there are two or more functional groups generated and/or introduced through the reaction between terminal epoxy groups of an epoxy resin and a reactive functional group-containing compound, the number of the functional groups at the terminals is counted as one. Furthermore, secondary hydroxyl groups in the interior of the molecule of the epoxy resin are not included in the number of the functional groups, for example, because they have low reactivity. In the present invention, the "functional group" in the sense of polyfunctional is substantially a reactive functional group capable of reacting with a curing agent such as a blocked polyisocyanate compound.

[Epoxy Resin]

<Epoxy Resin According to First Embodiment>

An epoxy resin according to a first embodiment of the present invention is an epoxy resin obtained by reacting at least a compound having one or more epoxy groups and a trihydric or higher phenol compound and/or a compound including a trifunctional or higher polyisocyanate.

In the reaction, a compound having one or more active hydrogens in one molecule that is other than the trihydric or higher phenol compound and/or a diisocyanate compound can be further reacted as needed.

The epoxy resin according to the first embodiment of the present invention is excellent in curability, particularly curability at the time when a low-activity catalyst is used and curability at low temperature, storage stability, and finished quality and corrosion resistance of a coating film formed of an electrodeposition paint prepared using the epoxy resin.

(Compound Having One or More Epoxy Groups)

The compound having one or more epoxy groups (the epoxy compound) is a compound having at least one epoxy group, preferably two or more epoxy groups, in one molecule. In the present invention, the number of epoxy groups in one molecule of the epoxy compound is preferably 2 to 8, more preferably 2 to 6, still more preferably 2 to 4, most preferably 2.

The weight-average molecular weight of the epoxy compound is not particularly limited. For example, the epoxy compound preferably has a weight-average molecular weight of at least 300, preferably in the range of 400 to 4,000, more preferably in the range of 800 to 2,500. The epoxy equivalent of the epoxy compound is also not particularly limited. For example, the epoxy compound suitably has an epoxy equivalent of at least 160, preferably in the range of 180 to 2,500, more preferably in the range of 400 to 1,500. As the epoxy compound, for example, one or more selected from the group consisting of epoxy compounds obtained by the reaction between polyphenol compounds and epihalohydrins (epichlorohydrin, etc.), epoxy compounds containing polyalkylene oxide chains in their molecules, dimer acid diglycidyl esters, and the like can be used.

In the present invention, an epoxy compound obtained by the reaction between a polyphenol compound and an epihalohydrin is suitably used.

As the polyphenol compound to be reacted with the epihalohydrin, any known polyphenol compound can be used without limitation. For example, one or more selected from the group consisting of bis(4-hydroxyphenyl)-2,2-propane [bisphenol A], bis(4-hydroxyphenyl)methane [bisphenol F], bis(4-hydroxycyclohexyl)methane [hydrogenated bisphenol F], 2,2-bis(4-hydroxycyclohexyl)propane [hydrogenated bisphenol A], 4,4'-dihydroxybenzophenone, bis(4-hydroxyphenyl)-1,1-ethane, bis(4-hydroxyphenyl)-1,1-isobutane, bis(4-hydroxy-3-tert-butyl-phenyl)-2,2-propane, bis(2-hydroxynaphthyl)methane, tetra(4-hydroxyphenyl)-1,1,2,2-ethane, 4,4'-dihydroxydiphenyl sulfone, phenol novolac, cresol novolac, and the like can be used.

As the epoxy compound, an epoxy compound containing a polyalkylene oxide chain in its molecule can be used. Typically, such an epoxy compound can be obtained by, for example, (α) reacting an epoxy compound having at least one epoxy group, preferably two or more epoxy groups, and an alkylene oxide or a polyalkylene oxide to introduce a polyalkylene oxide chain or (β) reacting the above polyphenol compound and a polyalkylene oxide having at least one epoxy group, preferably two or more epoxy groups, to introduce a polyalkylene oxide chain. Alternatively, an epoxy compound already containing a polyalkylene oxide chain may be used (see, for example, Japanese Unexamined Patent Application Publication No. 8-337750).

The alkylene group in the polyalkylene oxide chain is preferably an alkylene group having 2 to 8 carbon atoms, more preferably an ethylene group, a propylene group, or a butylene group, particularly preferably a propylene group.

From the viewpoint of stability during electrodeposition paint formation and improvement in finished quality and corrosion resistance, the appropriate content of the polyalkylene oxide chain is typically in the range of 1.0 to 15 mass %, preferably in the range of 2.0 to 9.5 mass %, more preferably in the range of 3.0 to 8.0 mass %, in terms of the content of polyalkylene oxide constituents based on the solid mass of the epoxy resin.

As the epoxy compound, a dimer acid diglycidyl ester can be used. Such an epoxy compound is obtained by introducing a glycidyl group into a dimer acid obtained by dimerizing an unsaturated fatty acid, and preferably has a linear, branched, and/or cyclic hydrocarbon group having 10 to 150 carbon atoms.

As the unsaturated fatty acid, any known unsaturated fatty acid can be used without limitation, but from the viewpoint of flexibility and hydrophobicity of the epoxy compound, a higher unsaturated fatty acid having 11 to 22 carbon atoms is preferred.

As the higher unsaturated fatty acid, any known higher unsaturated fatty acid can be used without limitation. Specifically, for example, one or more selected from the group consisting of oleic acid, linoleic acid, linolenic acid, eicosenoic acid, docosenoic acid, branched octadecenoic acid, branched hexadecenoic acid, undecylenic acid, and the like can be used.

In the present invention, it is preferable to use one or more epoxy compounds obtained by reacting epihalohydrins and one or more selected from bis(4-hydroxyphenyl)-2,2-propane [bisphenol A], bis(4-hydroxyphenyl)methane [bisphenol F], bis(4-hydroxycyclohexyl)methane [hydrogenated bisphenol F], 2,2-bis(4-hydroxycyclohexyl)propane [hydrogenated bisphenol A], 4,4'-dihydroxybenzophenone, bis(4-hydroxyphenyl)-1,1-ethane, bis(4-hydroxyphenyl)-1,1-isobutane, bis(4-hydroxy-3-tert-butyl-phenyl)-2,2-propane, bis(2-hydroxynaphthyl)methane, tetra(4-hydroxyphenyl)-1,1,2,2-ethane, 4,4'-dihydroxydiphenyl sulfone, phenol novolac, and cresol novolac.

Particularly preferred is, for example, an epoxy compound obtained by the reaction between a polyphenol compound and an epihalohydrin (e.g., epichlorohydrin), such as a compound derived from bisphenol A and represented by the following formula:

[Chem. 6]

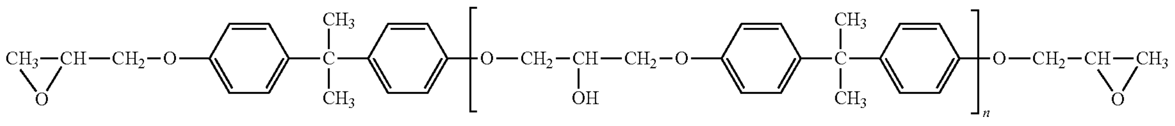

where n=0 to 8, and examples of commercially available products of such epoxy compounds include those marketed by Mitsubishi Chemical Corporation under the trade names jER828EL, jER1002, jER1004, and jER1007.

As described above, the secondary hydroxyl group in the interior of the molecule of the epoxy resin in the above formula is not included in functional groups in the sense of polyfunctional. For example, in a modified epoxy resin obtained by the reaction between a terminal epoxy group in the above formula and a reactive functional group-containing compound, a hydroxyl group resulting from the reaction of the epoxy group is also not included in functional groups in the sense of polyfunctional in the present invention.

(Trihydric or Higher Phenol Compound)

The trihydric or higher phenol compound is one or more compounds having, in their molecules, three or more hydroxyl groups bonded to an aromatic ring.

As a trihydric phenol compound, for example, one or more selected from the group consisting of pyrogallol, phloroglucinol, hydroxyhydroquinone, 5-methylpyrogallol, gallic acid, 1,8,9-trihydroxyanthracene, 4,4',4"-trihydroxytriphenylmethane, 4,4',4"-ethylidynetris(2-methylphenol), 4,4'-(2-hydroxybenzylidene)bis(2,3,6-trimethylphenol), 2,3,4-trihydroxydiphenylmethane, 2,4,6-tris(4-hydroxyphenyl)-1,3,5-triazine, 1,3,5-tris(4-hydroxyphenyl) benzene, 1,1,1-tris(4-hydroxyphenyl)ethane, 1,1,3-tris(4-hydroxyphenyl)propane, 4,4'-[1-[4-[1-(4-hydroxy-3,5-dimethylphenyl)-1-methylethyl]phenyl]ethylidene]bis(2-methylphenol), 4,4'-[1-[4-[1-(4-hydroxyphenyl)-1-methylethyl]phenyl]ethylidene]bisphenol, 2,6-bis(4-hydroxy-3,5-dimethylbenzyl)-4-methylphenol, 1,1,3-tris(2-methyl-4-hydroxy-5-tert-butylphenyl)propane, 1,1,3-tris(2-methyl-4-hydroxy-5-tert-butylphenyl)butane, 1-[α-methyl-α-(4-hydroxyphenyl)ethyl]-3-[α,α-bis(4-hydroxyphenyl) ethyl]benzene, 1-[α-methyl-α-(4-hydroxyphenyl)ethyl]-4-[α,α-bis(4-hydroxyphenyl)ethyl]benzene, α,α-bis(4-hydroxyphenyl)-4-(4-hydroxy-α,α-dimethylbenzyl)-ethylbenzene, and the like can be used.

As a tetrahydric or higher phenol compound, for example, one or more selected from the group consisting of 2,2'-methylenebis[6-(2-hydroxy-5-methylbenzyl)-p-cresol, 4-[bis(4-hydroxy-3-methylphenyl)methyl]benzene-1,2-diol, 1,1,2,2-tetrakis(p-hydroxyphenyl)ethane, α,α,α',α"-tetrakis (4-hydroxyphenyl)-p-xylene, 1,4,9,10-tetrahydroxyanthracene, 2,4,6-tris[(4-hydroxyphenyl)methyl]-1,3-benzenediol, hexahydroxybenzene, 2,3,6,7,10,11-hexahydroxytriphenylene hydrate, and the like can be used.

In addition, one or more selected from the group consisting of phenol resins obtained by the condensation reaction between phenol compound (phenol, cresol, bisphenol compound, etc.) components and aldehydes (formaldehyde, acetaldehyde, benzaldehyde, hydroxybenzaldehyde, crotonaldehyde, glyoxal, etc.) in the presence of catalyst can be used. For example, one or more selected from the group consisting of compounds represented by structural formula (A) below:

[Chem. 7]

(A)

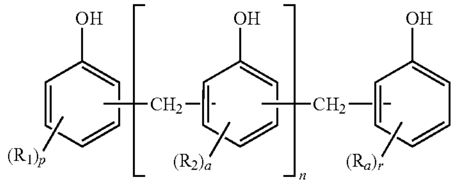

(where n is an integer of 1 to 20, p is an integer of 0 to 4, q is an integer of 0 to 3, and r is an integer of 0 to 4; $R_1$ to $R_3$ are each independently a monovalent group; $R_2$'s in n repeating units may be different from each other; when a plurality of $R_1$'s, $R_2$'s, and/or $R_3$'s are present in aromatic rings, the plurality of $R_1$'s, $R_2$'s, and/or $R_3$'s may be the same or different from each other; and $R_1$ to $R_3$ may be bonded to each other to form a ring), phenol novolac resins, cresol novolac resins, bisphenol novolac resins (bisphenol A novolac resin, etc.), naphthol novolac resins, phenol aralkyl resins, terpene phenol resins, dicyclopentadiene phenol resins, phenol biphenylene resins, phenol-modified toluene formaldehyde resins, co-condensation resins made of pitch or oils, phenol compounds, and formaldehyde, and the like can be used.

In the present invention, it is preferable to use one or more compounds represented by structural formula (A) above as the trihydric or higher phenol compound. $R_1$ to $R_3$ in structural formula (A) above are preferably organic groups having hydrogen or carbon. Examples of organic groups having carbon include monovalent alkyl groups having 1 to 20 carbon atoms, such as a methyl group, an ethyl group, a propyl group, and a butyl group.

(Compound Including Trifunctional or Higher Polyisocyanate)

As the compound including a trifunctional or higher polyisocyanate, one or more compounds having three or more isocyanate groups in their molecules are used.

For example, one or more selected from the group consisting of aliphatic triisocyanates such as 2,6-diisocyanatohexanoic acid 2-isocyanatoethyl (lysine ester triisocyanate), 1,6-diisocyanato-3-isocyanatomethylhexane, 1,4,8-triisocyanatooctane, 1,6,11-triisocyanatoundecane, 1,8-diisocyanato-4-isocyanatomethyloctane, 1,3,6-triisocyanatohexane, and 2,5,7-trimethyl-1,8-diisocyanato-5-isocyanatomethyloctane; alicyclic triisocyanates such as 1,3,5-triisocyanatocyclohexane, 1,3,5-trimethylisocyanatocyclohexane, 2-(3-isocyanatopropyl)-2,5-di(isocyanatomethyl)-bicyclo(2.2.1) heptane, 2-(3-isocyanatopropyl)-2,6-di(isocyanatomethyl)-bicyclo(2.2.1)heptane, 3-(3-isocyanatopropyl)-2,5-di (isocyanatomethyl)-bicyclo(2.2.1)heptane, 5-(2-isocyanatoethyl)-2-isocyanatomethyl-3-(3-isocyanatopropyl)-bicyclo(2.2.1)heptane, 6-(2-isocyanatoethyl) isocyanatomethyl-3-(3-isocyanatopropyl)-bicyclo(2.2.1)heptane, 5-(2-isocyanatoethyl) isocyanatomethyl-2-(3-isocyanatopropyl)-bicyclo(2.2.1)- heptane, bicycloheptane triisocyanate, and 6-(2-isocyanatoethyl)-2-isocyanatomethyl-2-(3-isocyanatopropyl)-bicyclo (2.2.1)heptane; araliphatic triisocyanates such as 1,3,5-triisocyanatomethylbenzene; aromatic triisocyanates such as triphenylmethane-4,4',4"-triisocyanate, 1,3,5-triisocyanatobenzene, and 2,4,6-triisocyanatotoluene; aromatic tetraisocyanates such as 4,4'-diphenylmethane-2,2',5,5'-tetraisocyanate; crude compounds of polyisocyanates such as crude MDI [polymethylene polyphenyl isocyanate] (polymeric MDI) represented by structural formula (C) below:

[Chem. 8]

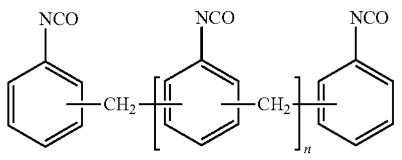

(C)

(where n is an integer of 1 or greater) and crude TDI [crude tolylene diisocyanate]; and the like can be used.

In addition, for example, one or more selected from the group consisting of compounds having three or more isocyanate groups in their molecules, that is, trimers and isocyanurates of aliphatic diisocyanates such as trimethylene diisocyanate, tetramethylene diisocyanate, hexamethylene diisocyanate, pentamethylene diisocyanate, 1,2-propylene diisocyanate, 1,2-butylene diisocyanate, 2,3-butylene diisocyanate, 1,3-butylene diisocyanate, 2,4,4- or 2,2,4-trimethylhexamethylene diisocyanate, methylene diisocyanate, dimer acid diisocyanate, and methyl 2,6-diisocyanatohexanoate (trivial name: lysine diisocyanate); alicyclic diisocyanates such as 1,3-cyclopentane diisocyanate, 1,3-cyclopentene diisocyanate, 1,4-cyclohexane diisocyanate, 1,3-cyclohexane diisocyanate, 3-isocyanatomethyl-3,5,5-trimethylcyclohexyl isocyanate (trivial name: isophorone diisocyanate), 4-methyl-1,3-cyclohexylene diisocyanate (trivial name: hydrogenated TDI), 2-methyl-1,3-cyclohexylene diisocyanate, 1,3- or 1,4-bis(isocyanatomethyl)cyclohexane (trivial name: hydrogenated xylylene diisocyanate) and mixtures thereof, methylenebis(4,1-cyclohexanediyl) diisocyanate (trivial name: hydrogenated MDI), and norbornane diisocyanate; araliphatic diisocyanate such as methylenebis(4,1-phenylene) diisocyanate (trivial name: MDI), 1,3- or 1,4-xylylene diisocyanate and mixtures thereof, ω,ω'-diisocyanato-1,4-diethylbenzene, and 1,3- or 1,4-bis(1-isocyanato-1-methylethyl)benzene (trivial name: tetramethylxylylene diisocyanate) and mixtures thereof; aromatic diisocyanates such as m-phenylene diisocyanate, p-phenylene diisocyanate, 4,4'-diphenyl diisocyanate, 1,5-naphthalene diisocyanate, 2,4-tolylene diisocyanate (trivial name: 2,4-TDI) or 2,6-tolylene diisocyanate (trivial name: 2,6-TDI) and mixtures thereof, 4,4'-toluidine diisocyanate, 4,4'-diphenyl ether diisocyanate, diphenylmethane-2,2'-diisocyanate, diphenylmethane-2,4'-diisocyanate, and diphenylmethane-4,4'-diisocyanate; and the like can be used.

Further examples include one or more selected from the group consisting of dimers, trimers, biurets, allophanates, uretdiones, uretonimines, isocyanurates, oxadiazinetriones, crude compounds, and the like of compounds including the above trifunctional or higher polyisocyanates.

The compound including a trifunctional or higher polyisocyanate may be a prepolymer obtained by reacting any one of the above polyisocyanates or a derivative thereof and a compound having an active hydrogen that can react with the polyisocyanate under an excess of isocyanate groups. Examples of the compound that can react with the polyisocyanate include one or more selected from the group consisting of polyhydric alcohols, low-molecular-weight polyester resins, amines, water, active hydrogen-containing resins (acrylic polyols, polyolefin polyols, polyurethane polyols, polyether polyols, polyester polyols), and the like.

The compound including a trifunctional or higher polyisocyanate may be a blocked polyisocyanate compound which is a compound obtained by blocking an isocyanate group in any of the above polyisocyanates or a derivative thereof with a blocking agent.

Examples of the blocking agent include phenol compounds such as phenol, cresol, xylenol, nitrophenol, ethylphenol, hydroxydiphenyl, butylphenol, isopropylphenol, nonylphenol, octylphenol, and methyl hydroxybenzoate; lactam compounds such as ε-caprolactam, δ-valerolactam, γ-butyrolactam, and β-propiolactam; aliphatic alcohol compounds such as methanol, ethanol, propanol, butanol, amyl alcohol, and lauryl alcohol; ether compounds such as ethylene glycol monomethyl ether, ethylene glycol monoethyl ether, ethylene glycol monobutyl ether, diethylene glycol monomethyl ether, diethylene glycol monoethyl ether, propylene glycol monomethyl ether, and methoxy methanol; alcohol compounds such as benzyl alcohol, glycolic acid, methyl glycolate, ethyl glycolate, butyl glycolate, lactic acid, methyl lactate, ethyl lactate, butyl lactate, methylol urea, methylol melamine, diacetone alcohol, 2-hydroxyethyl acrylate, and 2-hydroxyethyl methacrylate; oxime compounds such as formamide oxime, acetamide oxime, acetoxime, methyl ethyl ketoxime, diacetyl monooxime, benzophenone oxime, and cyclohexane oxime; active methylene compounds such as dimethyl malonate, diethyl malonate, ethyl acetoacetate, methyl acetoacetate, and acetylacetone; mercaptan compounds such as butyl mercaptan, t-butyl mercaptan, hexyl mercaptan, t-dodecyl mercaptan, 2-mercaptobenzothiazole, thiophenol, methylthiophenol, and ethylthiophenol; acid amide compounds such as acetanilide, acetanisidide, acetotoluide, acrylamide, methacrylamide, acetamide, stearamide, and benzamide; imide compounds such as succinimide, phthalimide, and maleimide; amine compounds such as diphenylamine, phenylnaphthylamine, xylidine, N-phenylxylidine, carbazole, aniline, naphthylamine, butylamine, dibutylamine, and butylphenylamine; urea compounds such as urea, thiourea, ethylene urea, ethylene thiourea, and diphenyl urea; carbamate ester compounds such as phenyl N-phenylcarbamate; imine compounds such as ethyleneimine and propyleneimine; sulfite compounds such as sodium bisulfite and potassium bisulfite; and azole compounds. Examples of the azole compounds include one or more selected from the group consisting of pyrazole and pyrazole derivatives such as pyrazole, 3,5-dimethylpyrazole, 3-methylpyrazole, 4-benzyl-3,5-dimethylpyrazole, 4-nitro-3,5-dimethylpyrazole, 4-bromo-3,5-dimethylpyrazole, and 3-methyl-5-phenylpyrazole; imidazole and imidazole derivatives such as imidazole, benzimidazole, 2-methylimidazole, 2-ethylimidazole, and 2-phenylimidazole; imidazoline derivatives such as 2-methylimidazoline and 2-phenylimidazoline; and the like.

When blocking is performed (a blocking agent is reacted), a solvent may be added as needed. The solvent used for the blocking reaction is preferably a solvent not reactive with isocyanate groups, and examples thereof include ketone solvents such as acetone and methyl ethyl ketone, ester solvents such as ethyl acetate, and pyrrolidone solvents such as N-methyl-2-pyrrolidone (NMP).

In the present invention, preferably, one or more selected from the group consisting of isocyanurate compounds of aliphatic diisocyanates, isocyanurate compounds of araliphatic diisocyanates, isocyanurate compounds of aromatic diisocyanates, crude compounds of polyisocyanates, and the like can be used as the compound including a trifunctional or higher polyisocyanate. Particularly preferably, one or more selected from the group consisting of isocyanurate compounds of hexamethylene diisocyanate, crude MDI (polymeric MDI), and crude TDI can be used.

(Compound Having One or More Active Hydrogens in One Molecule)

Examples of the compound having one or more active hydrogens in one molecule that is other than the trihydric or higher phenol compound include one or more selected from the group consisting of a dihydric phenol compound, a polyhydric alcohol compound, a polycarboxylic acid compound, a compound having one active hydrogen in one molecule, and the like.

The dihydric phenol compound is a compound having, in its molecule, two hydroxyl groups bonded to an aromatic ring. As the dihydric phenol compound, for example, one or more selected from the group consisting of bis(4-hydroxyphenyl)-2,2-propane [bisphenol A], bis(4-hydroxyphenyl) methane [bisphenol F], bis(4-hydroxycyclohexyl)methane [hydrogenated bisphenol F], 2,2-bis(4-hydroxycyclohexyl) propane [hydrogenated bisphenol A], 4,4'-dihydroxybenzophenone, bis(4-hydroxyphenyl)-1,1-ethane, bis(4-hydroxyphenyl)-1,1-isobutane, bis(4-hydroxy-3-tert-butyl-phenyl)-2,2-propane, bis(2-hydroxynaphthyl)methane, tetra(4-hydroxyphenyl)-1,1,2,2-ethane, 4,4'-dihydroxydiphenyl sulfone, biphenol, and the like can be used.

In the present invention, when a compound represented by structural formula (A) above is included as the trihydric or higher phenol compound, it is preferable to include, as the compound having one or more active hydrogens in one molecule, a compound represented by structural formula (B) below:

[Chem. 9]

(B)

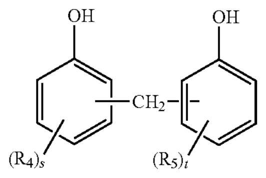

(where s is an integer of 0 to 4, and t is an integer of 0 to 4; $R_4$ and $R_5$ are each independently a monovalent group; when a plurality of $R_4$'s and/or $R_5$'s are present in aromatic rings, the plurality of $R_4$'s and/or $R_5$'s may be the same or different from each other; and $R_4$ and/or $R_5$ may be bonded to each other to form a ring).

As the polyhydric alcohol compound, for example, one or more selected from the group consisting of alkylene glycols (ethylene glycol, propylene glycol, butylene glycol, 1,6-hexanediol, etc.), glycerol, and the like can be used.

As the polycarboxylic acid compound, for example, one or more selected from the group consisting of oxalic acid, malonic acid, succinic acid, glutaric acid, adipic acid, phthalic acid, trimellitic acid, pyromellitic acid, trimesic acid, dimer acid, acid anhydrides thereof, and the like can be used.

As the compound having one active hydrogen in one molecule, one or more selected from the group consisting of monophenol compounds (phenol, cresol, nonylphenol, nitrophenol, etc.), monoalcohol compounds (hexyl alcohol, 2-ethylhexanol, stearyl alcohol, ethylene glycol monobutyl ether, ethylene glycol monohexyl ether, propylene glycol monobutyl ether, propylene glycol monohexyl ether, etc.), monocarboxylic acid compounds (saturated fatty acids such as formic acid, acetic acid, propionic acid, butyric acid, valeric acid, 2-ethylhexanoic acid (octyl acid), caproic acid, caprylic acid, stearic acid, oleic acid, and linoleic acid and unsaturated fatty acids), and the like can be used.

In addition, one or more selected from the group consisting of hydroxycarboxylic acids (glycolic acid, dimethylolpropionic acid, hydroxypropivalic acid, lactic acid, citric acid, etc.), mercaptoalkanols (mercaptoethanol, etc.), alkanolamines (ethanolamine, etc.), and the like can be used.

(Diisocyanate Compound)

Examples of the diisocyanate compound include one or more selected from the group consisting of aliphatic diisocyanates such as trimethylene diisocyanate, tetramethylene diisocyanate, hexamethylene diisocyanate, pentamethylene diisocyanate, 1,2-propylene diisocyanate, 1,2-butylene diisocyanate, 2,3-butylene diisocyanate, 1,3-butylene diisocyanate, 2,4,4- or 2,2,4-trimethylhexamethylene diisocyanate, methylene diisocyanate, dimer acid diisocyanate, and methyl 2,6-diisocyanatohexanoate (trivial name: lysine diisocyanate); alicyclic diisocyanates such as 1,3-cyclopentane diisocyanate, 1,3-cyclopentene diisocyanate, 1,4-cyclohexane diisocyanate, 1,3-cyclohexane diisocyanate, 3-isocyanatomethyl-3,5,5-trimethylcyclohexyl isocyanate (trivial name: isophorone diisocyanate), 4-methyl-1,3-cyclohexylene diisocyanate (trivial name: hydrogenated TDI), 2-methyl-1,3-cyclohexylene diisocyanate, 1,3- or 1,4-bis (isocyanatomethyl)cyclohexane (trivial name: hydrogenated xylylene diisocyanate) and mixtures thereof, methylenebis (4,1-cyclohexanediyl) diisocyanate (trivial name: hydrogenated MDI), and norbornane diisocyanate; araliphatic diisocyanates such as methylenebis(4,1-phenylene) diisocyanate (trivial name: MDI), 1,3- or 1,4-xylylene diisocyanate and mixtures thereof, ω,ω'-diisocyanato-1,4-diethylbenzene, and 1,3- or 1,4-bis(1-isocyanato-1-methylethyl)benzene (trivial name: tetramethylxylylene diisocyanate) and mixtures thereof; aromatic diisocyanates such as m-phenylene diisocyanate, p-phenylene diisocyanate, 4,4'-diphenyl diisocyanate, 1,5-naphthalene diisocyanate, 2,4-tolylene diisocyanate (trivial name: 2,4-TDI) or 2,6-tolylene diisocyanate (trivial name: 2,6-TDI) and mixtures thereof, 4,4'-toluidine diisocyanate, 4,4'-diphenyl ether diisocyanate, diphenylmethane-2,2'-diisocyanate, diphenylmethane-2,4'-diisocyanate, and diphenylmethane-4,4'-diisocyanate; diisocyanate compounds that are dimers, trimers, biurets, allophanates, uretdiones, uretonimines, oxadiazinetriones, and crude compounds of these diisocyanates; and the like.

The diisocyanate compound may be a prepolymer obtained by reacting any of the above diisocyanates or a derivative thereof and a compound having an active hydrogen that can react with the diisocyanate under an excess of isocyanate groups. The diisocyanate compound may also be a blocked diisocyanate compound which is a compound obtained by blocking an isocyanate group in any of the above diisocyanates or a derivative thereof with a blocking agent.

As the compound having an active hydrogen that can react with the diisocyanate, a compound used in forming a prepolymer of the compound including a trifunctional or higher polyisocyanate or a derivative thereof can be used. As the blocking agent, a compound used in forming a blocked polyisocyanate of the compound including a trifunctional or higher polyisocyanate or a derivative thereof can be used.

In the present invention, preferably, one or more selected from the group consisting of aliphatic diisocyanates, araliphatic diisocyanates, aromatic diisocyanates, and the like can be used as the diisocyanate compound. Particularly preferably, one or more selected from the group consisting of hexamethylene diisocyanate, xylylene diisocyanate, isophorone diisocyanate, and monomeric MDI (a compound represented by structural formula (C') below, where n=0) can be used.

[Chem. 10]

(C')

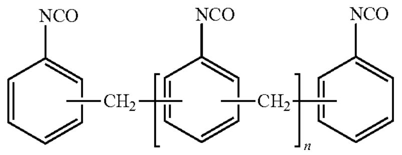

(Blending Amounts of Components)

The blending amounts of "the compound having one or more epoxy groups", "the trihydric or higher phenol compound and/or the compound including a trifunctional or higher polyisocyanate", and optional "the compound having one or more active hydrogens in one molecule that is other than the trihydric or higher phenol compound and/or the diisocyanate compound" used to produce the epoxy resin according to the first embodiment of the present invention can be appropriately adjusted depending on, for example, the target epoxy equivalent.

For example, the blending amounts of these components can be in the following ranges based on the total solid mass of "the compound having one or more epoxy groups", "the trihydric or higher phenol compound and/or the compound including a trifunctional or higher polyisocyanate", and "the compound having one or more active hydrogens in one molecule that is other than the trihydric or higher phenol compound and/or the diisocyanate compound".

"The compound having one or more epoxy groups": 50 to 99.9 mass %, preferably 65 to 95 mass %, more preferably 65 to 92 mass %.

"The trihydric or higher phenol compound and/or the compound including a trifunctional or higher polyisocyanate": 0.1 to 50 mass %, preferably 0.2 to 30 mass %, more preferably 0.5 to 20 mass %.

"The compound having one or more active hydrogens in one molecule that is other than the trihydric or higher phenol compound and/or the diisocyanate compound": 0 to 49.9 mass %, preferably 0 to 30 mass %, more preferably 1 to 30 mass %.

If the content of "the trihydric or higher phenol compound and/or the compound including a trifunctional or higher polyisocyanate" is less than 0.1 mass %, polyfunctional modification of the epoxy resin may be insufficient, and it may be impossible to obtain a polyfunctional and highly reactive epoxy resin. On the other hand, if the content of "the trihydric or higher phenol compound and/or the compound including a trifunctional or higher polyisocyanate" is more than 50 mass %, the epoxy resin may have excessively high reactivity, thus undergoing gelation during synthesis or providing a paint with poor storage stability.

When "the compound having one or more active hydrogens in one molecule that is other than the trihydric or higher phenol compound and/or the diisocyanate compound" is used, the blending amount of "the trihydric or higher phenol compound and/or the compound including a trifunctional or higher polyisocyanate" can be in the following range based on the total solid mass of "the trihydric or higher phenol compound and/or the compound including a trifunctional or higher polyisocyanate" and "the compound having one or more active hydrogens in one molecule that is other than the trihydric or higher phenol compound and/or the diisocyanate compound".

"The trihydric or higher phenol compound and/or the compound including a trifunctional or higher polyisocyanate": 0.1 to 99 mass %, preferably 0.5 to 95 mass %, more preferably 0.5 to 90 mass %.

(Method for Producing Epoxy Resin According to First Embodiment)

The reaction of the epoxy compound and the trihydric or higher phenol compound can be carried out, for example, in an appropriate solvent at a temperature of about 80° C. to 190° C., preferably about 90° C. to 170° C., for about 1 to 6 hours, preferably about 1 to 5 hours.

In the present invention, the epoxy resin can be polyfunctionalized with the trihydric or higher phenol compound. In addition, for example, the epoxy resin can be chain-extended with a compound having two active hydrogens in one molecule (e.g., a dihydric phenol compound).

As the solvent used in the reaction, for example, one or more selected from the group consisting of hydrocarbon solvents such as toluene, xylene, cyclohexane, and n-hexane; ester solvents such as methyl acetate, ethyl acetate, and butyl acetate; ketone solvents such as acetone, methyl ethyl ketone, methyl isobutyl ketone, and methyl amyl ketone; amide solvents such as dimethylformamide and dimethylacetamide; alcohol compounds such as methanol, ethanol, n-propanol, and i-propanol and ether alcohol compounds such as ethylene glycol monobutyl ether and diethylene glycol monoethyl ether; and the like can be used.

From the viewpoint of finished quality, corrosion resistance, etc., the weight-average molecular weight of the epoxy resin according to the first embodiment is typically in the range of 500 to 50,000, preferably in the range of 1,000 to 20,000, particularly preferably in the range of 1,500 to 10,000.

Unless otherwise specified, a weight-average molecular weight in this DESCRIPTION is a value obtained by converting a retention time (retention volume) measured using a gel permeation chromatograph (GPC) into a molecular weight of polystyrene by using a retention time (retention volume) of standard polystyrene of known molecular weight measured under the same conditions. Specifically, the measurement can be made using "HLC8120GPC" (trade name, manufactured by Tosoh Corporation) as a gel permeation chromatograph and four columns: "TSKgel G-4000HXL", "TSKgel G-3000HXL", "TSKgel G-2500HXL", and "TSKgel G-2000HXL" (trade names, all manufactured by Tosoh Corporation) under the following conditions: mobile phase, tetrahydrofuran; measurement temperature, 40° C.; flow rate, 1 mL/min; and detector, RI.

<Epoxy Resin According to Second Embodiment>

An epoxy resin according to a second embodiment of the present invention is an epoxy resin obtained by reacting at least a compound having one or more epoxy groups and a compound having a functional group that reacts with the epoxy groups. The epoxy resin has an average degree of polyfunctionalization (X1) per molecule, as expressed by Formula (1) below, of 0.30 or more, Average degree of polyfunctionalization ($X1$)=number of ends per molecule of epoxy resin−2. Formula (1):

Examples of "the compound having one or more epoxy groups" used to obtain the epoxy resin according to the second embodiment include "the compound having one or more epoxy groups" used to obtain the epoxy resin according to the first embodiment.

Examples of "the compound having a functional group that reacts with the epoxy groups" include one or more selected from "the trihydric or higher phenol compound", "the compound including a trifunctional or higher polyisocyanate", and "the compound having one or more active hydrogens in one molecule" used to obtain the epoxy resin according to the first embodiment.

Furthermore, the blending amounts of these components may be the same as in the epoxy resin according to the first embodiment.

The properties of the epoxy resin according to the second embodiment of the present invention, such as curability, particularly curability at the time when a low-activity catalyst is used and curability at low temperature, storage stability, and finished quality and corrosion resistance of a coating film formed of an electrodeposition paint prepared using the epoxy resin, are closely related to the degree of polyfunctionalization of the epoxy resin. In particular, when the average degree of polyfunctionalization (X1) per molecule of the epoxy resin is employed as the degree of polyfunctionalization of the epoxy resin and is in a specific range, these properties can be appropriate ones.

The epoxy resin may be polyfunctionalized by (1) reacting the epoxy resin (having one or more, preferably two or more, epoxy groups) with a polyfunctionalizing agent having three or more reactive functional groups that react with the epoxy groups (polyfunctionalization by a polyfunctionalizing agent) or (2) reacting a secondary hydroxyl group in the interior of the molecule of the epoxy resin with at least one of the terminal epoxy groups of another epoxy resin (polyfunctionalization by hot process). Both methods can be suitably used. To stably produce the epoxy resin, it is preferable to use at least the method (1).

The average degree of polyfunctionalization (X1) per molecule of the epoxy resin can be determined by the following formula.

Average degree of polyfunctionalization ($X1$)=number of ends per molecule of epoxy resin−2

In the formula, "number of ends per molecule of epoxy resin" is the number of ends having an epoxy group or a functional group that reacts with the epoxy group in one molecule of the epoxy resin.

For example, when one molecule is branched to have three ends, X is 1, and in the case of a linear epoxy resin with no polyfunctionalization, X is 0. Larger values of the average degree of polyfunctionalization (X1) indicate higher degrees of polyfunctionalization per molecule.

Polyfunctionalization of an epoxy resin end by reacting the epoxy resin end with a polyfunctional modifier (e.g., an amine compound such as diethanolamine or a ketiminated product of diethylenetriamine, or a carboxylic acid compound such as dimethylolpropionic acid) is not defined as "polyfunctionalization" in the present invention because the reactivity will be lowered due to steric hindrance. Secondary hydroxyl groups in the interior of the epoxy resin are also not defined as "polyfunctionalization" in the present invention from the viewpoint of reactivity.

"Polyfunctionalization" in the present invention means that the main backbone of the epoxy resin is branched. "Number of ends per molecule of epoxy resin" in the present invention refers to the number of functional group-containing molecular ends resulting from branching of the main backbone of the epoxy resin (the main chain of the epoxy resin).

When the epoxy resin is polyfunctionalized by the above method (1) (polyfunctionalization by a polyfunctionalizing agent), the average degree of polyfunctionalization (N) by a polyfunctionalizing agent per molecule of the epoxy resin can be determined by the following formula.

Average degree of polyfunctionalization ($N$) by polyfunctionalizing agent=Σ[(valence of each polyfunctionalizing agent−2)×basic blending amount of each polyfunctionalizing agent]

Here, the "basic blending amount" of each polyfunctionalizing agent can be determined by the following method.

(Method of Calculating Basic Blending)

Basic blending amount (mol) of each raw material=blending amount (mol) of each raw material×basic blending coefficient Blending amount (mol) of each raw material=blending mass (g) of each raw material/molecular weight of each raw material Basic blending coefficient=2/(number (mol) of epoxy groups−number (mol) of functional groups that react with epoxy groups excluding end capping agent−number of polyfunctionalizations by polyfunctionalizing agent)

End capping agent: monofunctional amine, acid, etc.

Functional groups that react with epoxy groups: bifunctional or higher phenolic hydroxyl group and isocyanate group, amino group of amine having two or more active hydrogens, etc.

Number of polyfunctionalizations by polyfunctionalizing agent=(valence of polyfunctionalizing agent−2)×blending amount (mol) of polyfunctionalizing agent The above method (2) (polyfunctionalization by hot process) is a method in which an epoxy group of the epoxy resin and a secondary hydroxyl group of a (different) epoxy resin are reacted with each other.

In this case, the average degree of polyfunctionalization (M) by hot process per molecule of the epoxy resin can be determined by the following formula.

Average degree of polyfunctionalization ($M$) by hot process=$(2-m)/(1-m)-2$ m: excess epoxy in basic blending Here, excess epoxy in basic blending (excess EP) is calculated as follows.

Excess $EP$ in basic blending=number (mol) of $EP$ groups in basic blending−number (mol) of functional groups that react with $EP$ groups in basic blending The excess EP in the epoxy resins according to the first to third embodiments of the present invention is typically 0 to 5 mmol/g, preferably 0 to 2 mmol/g, more preferably 0 to 1.5 mmol/g, based on the resin solid content.

The average degree of polyfunctionalization (X1) per molecule of the epoxy resin can be calculated from the average degree of polyfunctionalization (N) by a polyfunctionalizing agent and the average degree of polyfunctionalization (M) by hot process using the following formula.

$$\text{Average degree of polyfunctionalization }(X1)=(N+2)\times(M+1)-M-2$$

In the epoxy resin according to the second embodiment of the present invention, the average degree of polyfunctionalization (X1) per molecule of the epoxy resin may be 0.30 or more, preferably in the range of 0.30 to 15.00, more preferably in the range of 0.60 to 13.00, still more preferably in the range of 0.70 to 10.00, particularly preferably in the range of 0.90 to 8.00.

<Epoxy Resin According to Third Embodiment>

An epoxy resin according to a third embodiment of the present invention is an epoxy resin obtained by reacting at least a compound having one or more epoxy groups and a compound having a functional group that reacts with the epoxy groups. When epoxy resins with different degrees of polyfunctionalization are included, the following calculation of the average degree of polyfunctionalization (X1) is the average of the epoxy resins.

The epoxy resin has an average degree of polyfunctionalization (X1), as expressed by Formula (1) below, of 0.30 or more and an average concentration of polyfunctionalization (Y1), as expressed by Formula (2) below, of 0.1 or more.

$$\text{Average degree of polyfunctionalization }(X1)=\text{number of ends per molecule of epoxy resin}-2 \quad \text{Formula (1):}$$

$$\text{Average concentration of polyfunctionalization }(Y1)=\text{average degree of polyfunctionalization }(X1)\text{ of epoxy resin}\div\text{weight-average molecular weight Mw of epoxy resin}\times1000 \quad \text{Formula (2):}$$

Examples of "the compound having one or more epoxy groups" used to obtain the epoxy resin according to the third embodiment include one or more selected from the examples of "the compound having one or more epoxy groups" used to obtain the epoxy resin according to the first embodiment.

Examples of "the compound having a functional group that reacts with the epoxy groups" include one or more selected from "the trihydric or higher phenol compound", "the compound including a trifunctional or higher polyisocyanate", and "the compound having one or more active hydrogens in one molecule" used to obtain the epoxy resin according to the first embodiment.

Furthermore, the blending amounts of these components may be the same as in the epoxy resin according to the first embodiment.

The properties of the epoxy resin according to the third embodiment of the present invention, such as curability, particularly curability at the time when a low-activity catalyst is used and curability at low temperature, storage stability, and finished quality and corrosion resistance of a coating film formed of an electrodeposition paint prepared using the epoxy resin, are closely related to the average concentration of polyfunctionalization of the epoxy resin as well as the degree of polyfunctionalization of the epoxy resin. In particular, when the average degree of polyfunctionalization (X1) per molecule of the epoxy resin and the average concentration of polyfunctionalization (Y1) are employed as the degree of polyfunctionalization of the epoxy resin and are each in a specific range, these properties can be appropriate ones.

In the epoxy resin according to the third embodiment, the average degree of polyfunctionalization (X1) of the epoxy resin expressed by Formula (1) below is the same as the average degree of polyfunctionalization (X1) of the epoxy resin in the epoxy resin according to the second embodiment.

$$\text{Average degree of polyfunctionalization }(X1)=\text{number of ends per molecule of epoxy resin}-2 \quad \text{Formula (1):}$$

In the epoxy resin according to the third embodiment of the present invention, the average degree of polyfunctionalization (X1) per molecule of the epoxy resin may be 0.30 or more, preferably in the range of 0.30 to 15.00, more preferably in the range of 0.60 to 13.00, still more preferably in the range of 0.70 to 10.00, particularly preferably in the range of 0.90 to 8.00.

In the epoxy resin according to the third embodiment, the average concentration of polyfunctionalization of the epoxy resin (Y1) is calculated from the average degree of polyfunctionalization (X1) of the epoxy resin and the weight-average molecular weight Mw of the epoxy resin using Formula (2) below.

$$\text{Average concentration of polyfunctionalization }(Y1)=\text{average degree of polyfunctionalization }(X1)\text{ of epoxy resin}\div\text{weight-average molecular weight Mw of epoxy resin}\times1000 \quad \text{Formula (2):}$$

Here, the weight-average molecular weight Mw of the epoxy resin is calculated as follows.

$$\text{Weight-average molecular weight Mw of epoxy resin}=\Sigma(\text{blending amount (mol) of each raw material in basic blending}\times\text{molecular weight of each raw material})$$

The average number of functional groups per molecule of a trifunctional or higher polyfunctionalizing agent component contained in a polyfunctionalizing agent is calculated using the following formula.

$$\text{Average number of functional groups}=\Sigma(\text{content ratio of each polyfunctionalizing agent component}\div\text{molecular weight of each polyfunctionalizing agent component}\times\text{number of functional groups in each polyfunctionalizing agent component})/\Sigma(\text{content ratio of each polyfunctionalizing agent component}\div\text{molecular weight of each polyfunctionalizing agent component})$$

In the epoxy resin according to the third embodiment of the present invention, the average concentration of polyfunctionalization (Y1) per gram of the solid content of the epoxy resin may be 0.10 (mmol/g) or more, preferably in the range of 0.10 to 5.00, more preferably in the range of 0.40 to 3.00, still more preferably in the range of 0.40 to 2.00.

The average concentration of polyfunctionalization (Y1) defines the degree of polyfunctionalization per mass, and larger values of Y1 indicate more functional groups and higher reactivity of the resin.

If the degree of polyfunctionalization and/or the concentration of polyfunctionalization is high, gelation or thickening will occur during the synthesis of the resin, resulting in a coating film with poor finished quality. If the degree of polyfunctionalization and/or the concentration of polyfunctionalization is low, corrosion resistance and oil crawling resistance will decrease.

The epoxy resins according to the first to third embodiments may each have a terminal functional group other than epoxy groups. For example, after the synthesis of the epoxy resins described in the first to third embodiments, an epoxy group of each polyfunctional epoxy resin may be reacted with a reactive functional group-containing compound to provide a modified epoxy resin having a different reactive functional group at an end. It should be noted, however, that when one epoxy group at an end of an epoxy resin and a reactive functional group-containing compound (e.g., diethanolamine) are reacted with each other to form a plurality of terminal functional groups (in the case of diethanolamine, the epoxy group and a secondary amino group of diethanolamine are reacted with each other to form two hydroxyl groups derived from diethanolamine and a hydroxyl group derived from the epoxy group), "the number of functional groups in the sense of polyfunctional" in the present invention is one as described above.

The functional group that reacts with epoxy groups is not particularly limited as long as it can react with epoxy groups, and examples thereof include a carboxyl group, a primary or secondary amino group, and a hydroxyl group.

Also in the case as described above (modified epoxy resin), the calculation of the average degree of polyfunctionalization (X1) and the average concentration of polyfunctionalization (Y1) can be carried out in the same manner.

[Amino-Containing Epoxy Resin]

The epoxy resin of the present invention may be an amino-containing epoxy resin having an amino group.

The amino-containing epoxy resin can be obtained by reacting any one of the epoxy resins according to the first to third embodiments and an amine compound.

The amino-containing epoxy resin obtained by reacting the epoxy resin according to the first embodiment and an amine compound is, for example, (a) or (b) below.

(a) An amino-containing epoxy resin obtained by reacting an amine compound and an epoxy resin obtained by reacting at least a compound having two or more epoxy groups and a compound including a trihydric or higher phenol compound. The trihydric or higher phenol compound includes a compound represented by structural formula (A) below:

[Chem. 11]

(A)

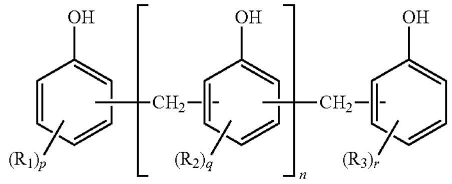

(where n is an integer of 1 to 20, p is an integer of 0 to 4, q is an integer of 0 to 3, and r is an integer of 0 to 4; $R_1$ to $R_3$ are each independently a monovalent group; $R_2$'s in n repeating units may be different from each other; when a plurality of $R_1$'s, $R_2$'s, and/or $R_3$'s are present in aromatic rings, the plurality of $R_1$'s, $R_2$'s, and/or $R_3$'s may be the same or different from each other; and $R_1$ to $R_3$ may be bonded to each other to form a ring).

(b) An amino-containing epoxy resin obtained by reacting an amine compound with an epoxy resin obtained by reacting at least a compound having one or more epoxy groups and a trihydric or higher phenol compound and/or a compound including a trifunctional or higher polyisocyanate. The trihydric or higher phenol compound is not a xylene formaldehyde resin.

The epoxy compound used to obtain any one of the epoxy resins according to the first to third embodiments is preferably not reacted with an amine compound in advance.

If necessary, the epoxy compound used to obtain any one of the epoxy resins according to the first to third embodiments may be reacted with an amine compound in advance. In this case, the amount of amine compound used can be appropriately determined so that the amine value and other values of the amino-containing epoxy resin will be desired values, and is preferably 99 mol % or less relative to the total amine compound.

<Amine Compound>

The amine compound is not particularly limited as long as it is an amine compound having reactivity with the epoxy resin. For example, one or more selected from the group consisting of mono-alkylamines and di-alkylamines such as monomethylamine, dimethylamine, monoethylamine, diethylamine, dipropylamine, dibutylamine, dihexylamine, dioctylamine, monoisopropylamine, diisopropylamine, monobutylamine, monooctylamine, methylbutylamine, and dibutylamine; alkanolamines such as monoethanolamine, N-methylethanolamine, N-ethylethanolamine, diethanolamine, mono(2-hydroxypropyl)amine, di(2-hydroxypropyl)amine, N-butylethanolamine, dipropanolamine, monomethylaminoethanol, N-(2-hydroxypropyl)ethylenediamine, 3-methylamino-1,2-propanediol, 3-tert-butylamino-1,2-propanediol, N-methylglucamine, and N-octylglucamine; alkylene polyamines such as polymethylenediamine, polyether diamine, ethylenediamine, propylenediamine, butylenediamine, hexamethylenediamine, trimethylhexamethylenediamine, triethylenetetramine, dimethylaminopropylamine, diethylenetriamine, diethylaminopropylamine, and bis(4-aminobutyl)amine; aromatic and alicyclic polyamines such as menthenediamine, isophoronediamine, bis(4-amino-3-methylcyclohexyl)methane, meta-xylylenediamine, meta-phenylenediamine, naphthylenediamine, and dimethylaminomethylbenzene; polyamines having heterocycles such as piperazine, 1-methylpiperazine, 3-pyrrolidinol, 3-piperidinol, and 4-pyrrolidinol; epoxy-added polyamines obtained by adding 1 to 30 mol of an epoxy-containing compound to 1 mol of the above polyamines; polyamide polyamines produced by condensation of the above polyamines and aromatic acid anhydrides, cyclic aliphatic acid anhydrides, aliphatic acid anhydrides, halogenated acid anhydrides, and/or dimer acids and containing one or more primary or secondary amines in polyamide resin molecules; ketiminated amines obtained by reacting one or more primary or secondary amines in the above polyamines and a ketone compound; and the like can be used.

As the ketone compound for producing the above ketiminated amines, any ketone compound that reacts with the primary or secondary amines in the above polyamines to form a ketiminated product and further hydrolyzes in an aqueous paint composition can be used without particular limitation. For example, one or more selected from the group consisting of methyl isopropyl ketone (MIPK), diisobutyl ketone (DIBK), methyl isobutyl ketone (MIBK), diethyl ketone (DEK), ethyl butyl ketone (EBK), ethyl propyl ketone (EPK), dipropyl ketone (DPK), methyl ethyl ketone (MEK), and the like can be used. In the present invention, when a ketiminated amine is used, its ketimination ratio is not particularly limited. For example, the ketimination ratio is preferably 80% or more.

The amino-containing epoxy resin can be modified with a modifier as needed. Such a modifier is not particularly limited as long as it is a resin or compound having reactivity with the epoxy resin, and, for example, one or more selected from the group consisting of polyols, polyether polyols, polyester polyols, polyamidoamines, polycarboxylic acids, fatty acids, polyisocyanate compounds, compounds obtained by reaction of polyisocyanate compounds, lactone compounds such as ε-caprolactone, acrylic monomers, compounds obtained by polymerization reaction of acrylic monomers, xylene formaldehyde compounds, epoxy compounds, and the like can be used.

The ratio of the modifier used is not strictly limited and can be appropriately varied depending on the use of the paint composition or the like. From the viewpoint of improving finished quality and corrosion resistance, the suitable range is typically 0 to 50 mass %, preferably 0.1 to 30 mass %, more preferably 1 to 20 mass %, based on the solid mass of the amino-containing epoxy resin.

<Method for Producing Amino-Containing Epoxy Resin>

The reaction of the epoxy resin according to the first embodiment (an epoxy resin obtained by reacting at least a compound having one or more epoxy groups and a trihydric or higher phenol compound and/or a compound including a trifunctional or higher polyisocyanate) and the amine compound can be carried out, for example, in an appropriate solvent at a temperature of about 80° C. to 190° C., preferably about 90° C. to 170° C., for about 1 to 6 hours, preferably about 1 to 5 hours.

As the solvent for use in the reaction, for example, the same solvent as used in producing the epoxy resin according to the first embodiment can be used.

From the viewpoint of finished quality, corrosion resistance, etc., the weight-average molecular weight of the amino-containing epoxy resin is typically in the range of 1,000 to 50,000, preferably in the range of 1,300 to 20,000, particularly preferably in the range of 1,600 to 10,000.

From the viewpoint of improving water dispersibility and corrosion resistance, the amine value of the amino-containing epoxy resin is typically 5 mgKOH/g or more, preferably in the range of 10 to 200 mgKOH/g, more preferably in the range of 30 to 150 mgKOH/g, based on the resin solid content.

Amine values in this DESCRIPTION are measured in accordance with JIS K 7237-1995. All amine values (mgKOH/g) are per resin solid content.

The weight-average molecular weight of the amino-containing epoxy resin is the same as described for the epoxy resin according to the first embodiment.

[Aqueous Resin Dispersion]

An aqueous resin dispersion of the present invention is obtained by dispersing one or more epoxy resins selected from the epoxy resins according to the first to third embodiments and modified products thereof in an aqueous medium.

For example, the aqueous resin dispersion can be obtained by dispersing the epoxy resins according to the first to third embodiments in an aqueous medium.

Alternatively, (i) an amino-containing epoxy resin obtained by reacting any one of the epoxy resins according to the first to third embodiments and an amine compound and/or (ii) an amino-containing epoxy resin obtained by using an epoxy compound preliminarily reacted with an amine compound as an epoxy compound for use in obtaining any one of the epoxy resins according to the first to third embodiments can be neutralized with an acid compound and dispersed in an aqueous medium to obtain the aqueous resin dispersion.

In the present invention, the term "aqueous resin dispersion" refers to a dispersion in which resin components are present in the form of particles without being dissolved in the aqueous medium.

The content of one or more epoxy resins selected from the epoxy resins according to the first to third embodiments and modified products thereof in the aqueous resin dispersion is preferably 50 mass % or more based on the solid content.

The aqueous resin dispersion is preferably prepared by mixing any of the epoxy resins according to the first to third embodiments and/or a modified product thereof with a curing agent (e.g., a blocked polyisocyanate compound) described later and dispersing the mixture in an aqueous medium. In this case, the epoxy resin and/or the modified product thereof is preferably an amino-containing epoxy resin, and the curing agent is preferably a blocked polyisocyanate compound.

The mixing ratio (mass ratio) of the epoxy resin and/or the modified product thereof to the curing agent is preferably 1/99 to 99/1, more preferably 30/70 to 90/10, still more preferably 40/60 to 85/15, in terms of solid content.

The aqueous medium used to disperse one or more epoxy resins selected from the epoxy resins according to the first to third embodiments and modified products thereof is a solvent containing water and/or a hydrophilic solvent as the principal components (contained in an amount of 50 mass % or more in the solvent). Other solvents such as ester solvents, ketone solvents, amide solvents, alcohol solvents, ether alcohol solvents, and mixtures thereof may be contained.

Here, as the hydrophilic solvent, specifically, for example, one or more selected from the group consisting of ethylene glycol, ethylene glycol monoalkyl ethers (e.g., methyl ether, ethyl ether, and butyl ether), diethylene glycol, diethylene glycol monoalkyl ethers (e.g., methyl ether, ethyl ether, and butyl ether), glyme solvents (e.g., ethylene glycol dimethyl ether), diglyme solvents (e.g., diethylene glycol dimethyl ether), alcohol solvents (e.g., methanol, ethanol, propanol, and n-butanol), propylene glycol, propylene glycol monoalkyl ethers (e.g., methyl ether, ethyl ether, and butyl ether), dipropylene glycol, dipropylene glycol monoalkyl ethers (e.g., methyl ether, ethyl ether, and butyl ether), and the like can be used.

As the acid compound used during the process of dispersion in the aqueous medium, a known acid compound can be used without particular limitation. Specific examples thereof include inorganic acids such as hydrochloric acid, nitric acid, phosphoric acid, and sulfamic acid; and organic acids including carboxylic acid compounds such as formic acid, acetic acid, propionic acid, and lactic acid. These acid compounds may be used alone or in combination of two or more. Among them, organic acids can be preferably used, and in particular, carboxylic acid compounds can be more preferably used.

The neutralization equivalent of the acid compound is preferably 0.2 to 1.5 equivalents, more preferably 0.5 to 1.0 equivalents, with respect to 1 equivalent of amino groups.

In addition to the acid compound and one or more epoxy resins selected from the epoxy resins according to the first to third embodiments and modified products thereof, the aqueous resin dispersion of the present invention may optionally contain, for example, additives such as a neutralizer, an emulsifier, and a catalyst and other resin components.

The dispersion of the amino-containing epoxy resin in the aqueous medium may be carried out by adding the aqueous medium to the neutralized amino-containing epoxy resin with stirring, adding the neutralized amino-containing epoxy resin to the aqueous medium with stirring, or mixing the aqueous medium and the neutralized amino-containing epoxy resin and then stirring the mixture. The dispersion temperature is preferably lower than 100° C., more preferably 40° C. to 99° C., still more preferably 50° C. to 95° C. The resin solid concentration of the resulting dispersion is preferably 5 to 80 mass %, more preferably 10 to 50 mass %.

[Electrodeposition Paint]

An electrodeposition paint of the present invention may be either a cationic electrodeposition paint or an anionic electrodeposition paint as long as it contains the epoxy resin described above.

The cationic electrodeposition paint preferably contains, as a coating film-forming resin component, any of the epoxy resins according to the first to third embodiments of the present invention or an amino-containing epoxy resin obtained by reacting the epoxy resin and an amine compound. Alternatively, the cationic electrodeposition paint may contain an aqueous resin dispersion in which any of the epoxy resins according to the first to third embodiments of the present invention or an amino-containing epoxy resin obtained by reacting the epoxy resin and an amine compound is dispersed in an aqueous medium.

The anionic electrodeposition paint preferably contains, as a coating film-forming resin component, any of the epoxy resins according to the first to third embodiments of the present invention or an amino-containing epoxy resin obtained by reacting the epoxy resin and an amine compound. Alternatively, the anionic electrodeposition paint may contain an aqueous resin dispersion in which any of the epoxy resins according to the first to third embodiments of the present invention or an amino-containing epoxy resin obtained by reacting the epoxy resin and an amine compound is dispersed in an aqueous medium.

<Cationic Electrodeposition Paint>

The cationic electrodeposition paint of the present invention contains, as essential components, a coating film-forming resin component containing any of the epoxy resins according to the first to third embodiments and a curing agent capable of curing the epoxy resin. The cationic electrodeposition paint may optionally contain a curing catalyst, a pigment, a solvent such as water, and additives (a surfactant, a surface conditioner, a curing promoter, a neutralizer, etc.). The epoxy resin is preferably an amino-containing epoxy resin (I) obtained by reacting any of the epoxy resins according to the first to third embodiments and an amine compound.

The cationic electrodeposition paint of the present invention is, for example, a cationic electrodeposition paint containing the amino-containing epoxy resin described in [Amino-containing epoxy resin] above and a curing agent.

The cationic electrodeposition paint of the present invention is, for example, a single-layer type cationic electrodeposition paint containing the amino-containing epoxy resin described in [Amino-containing epoxy resin] above and a curing agent.

The content of the amino-containing epoxy resin in the cationic electrodeposition paint of the present invention is preferably 71 mass % or more, more preferably 85 mass % or more, based on 100 mass % of resin components other than the curing agent in the cationic electrodeposition paint.

The cationic electrodeposition paint of the present invention is preferably a single-layer type cationic electrodeposition paint. The single-layer type cationic electrodeposition paint is a paint that forms, when subjected to cationic electrodeposition and heat curing, a single-layer coating film whose component in the thickness direction is substantially uniform.

For example, the single-layer type cationic electrodeposition paint of the present invention is a cationic electrodeposition paint that forms, when subjected to electrodeposition, a coating film whose section is not separated into two layers (or multilayers) when observed under a microscope. Even if a pigment component, a resin component, or the like is somewhat uneven, the coating film is a single layer as long as no interlayer boundaries appear in sectional observation.

Furthermore, the single-layer type cationic electrodeposition paint of the present invention is, for example, a cationic electrodeposition paint that does not form, when subjected to one-time electrodeposition, a multilayer film having a concentration gradient such that a corrosion-resistant resin (epoxy resin) is mainly distributed in the lower layer portion (metal substrate surface side, hereinafter the same) and resins other than the epoxy resin are mainly distributed in the upper layer portion.

As a coating film-forming resin component other than the amino-containing epoxy resin (I), one or more selected from the group consisting of acrylic resins, epoxy resins other than the epoxy resins according to the first to third embodiments of the present invention and modified products thereof (including amino-modified products), urethane resins, melamine resins, and the like can be used.

When the cationic electrodeposition paint contains an acrylic resin, the content of the acrylic resin in the cationic electrodeposition paint is preferably less than 30 mass % from the viewpoint of, for example, corrosion resistance, more preferably less than 15 mass %, still more preferably less than 3 mass %, based on the total amount of all the epoxy resins (including modified products) and the acrylic resin taken as 100 mass %.

From the viewpoint of compatibility between resins and finished quality, the absolute value of the difference in solubility parameter (SP value) between at least one epoxy resin and the acrylic resin is preferably less than 1.0, more preferably less than 0.5. By using resins having close SP values, a coating film free from phase separation can be formed.

Here, the solubility parameter is what is generally called an SP value, which is an index of the degree of hydrophilicity or hydrophobicity of a resin. The solubility parameter also serves as an important index in determining the compatibility between resins, and resins whose solubility parameter values are close to each other (the absolute value of a difference in solubility parameter is small) generally have good compatibility.

An actually measured solubility parameter, which is a value measured by cloud-point titration, is calculated according to the following formula of K. W. SUH and J. M. CORBETT (see the description in Journal of Applied Polymer Science, VOL. 12, 2359 to 2370 (1968)).

$$\text{Actually measured solubility parameter } (SP \text{ value}) = (\sqrt{Vml}\cdot\delta H+\sqrt{Vmh}\cdot\delta D)/(\sqrt{Vml}+\sqrt{Vmh})$$

Vml, Vmh, δH, and δD are values calculated as follows: n-hexane is added into a solution of 0.5 g (solid content) of a resin in 10 mL of tetrahydrofuran at a measurement temperature of 20° C., the limit at which No. 4 types on a newspaper placed under the bottom are readable when seen from above the beaker is determined as a cloud point, and a titer H (mL) at the cloud point and a titer D (mL) at a cloud point determined when deionized water is added into a solution of 0.5 g (solid content) of a resin in 10 mL of tetrahydrofuran at a measurement temperature of 20° C. are substituted into the following formulae.

$$Vml=81.1\times130.3/\{(1-VH)\times130.3+VH\times81.1\}$$

$$Vmh=81.1\times18/\{(1-VD)\times18+VD\times81.1\}$$

$$VH=H/(10+H)$$

$$VD=D/(10+D)$$

$\delta H=9.52\times10/(10+H)+7.24\times H/(10+H)$ $\delta D=9.52\times10/(10+D)+23.43\times D/(10+D)$ The molecular volumes (mL/mol) of the solvents are as follows: tetrahydrofuran, 81.1; n-hexane, 130.3; deionized water, 18. The SP values of the solvents are as follows: tetrahydrofuran, 9.52; n-hexane, 7.24; deionized water, 23.43.

The acrylic resin is not particularly limited, but is preferably a cationic acrylic resin.

The cationic acrylic resin can be produced, for example, by radical copolymerization of a cationic base-containing acrylic monomer and other monomers. Acrylic resins other than the cationic acrylic resin can be produced by using only other monomers described later.

Specific examples of the cationic base-containing acrylic monomer include amino-containing acrylic monomers such as N,N-dimethylaminoethyl (meth)acrylate, N,N-diethylaminoethyl (meth)acrylate, N,N-dimethylaminopropyl (meth)acrylate, and N,N-di-t-butylaminoethyl (meth)acrylate and quaternary chlorides thereof; quaternary ammonium base-containing acrylic monomers such as (meth)acryloyloxyethyltrimethylammonium chloride, (meth)acryloyloxyethyldimethylbenzylammonium chloride, (meth)acryloyloxyethyltrimethylammonium methyl sulfate, and (meth) acryloyloxyethyldimethylethylammonium ethyl sulfate; and tertiary sulfonium base-containing acrylic monomers such as 4-(dimethylsulfonio)phenyl methacrylate. These may be used alone or in combination of two or more.

As the other monomers, any known monomers other than the cationic base-containing acrylic monomer can be suitably used, and examples thereof include (meth)acrylic acid, aromatic vinyl monomers such as styrene, vinyltoluene, and α-methylstyrene, methyl (meth)acrylate, ethyl (meth)acrylate, n-propyl (meth)acrylate, isopropyl (meth)acrylate, n-butyl (meth)acrylate, isobutyl (meth)acrylate, t-butyl (meth)acrylate, cyclohexyl (meth)acrylate, 2-ethylhexyl (meth)acrylate, 2-hydroxyethyl (meth)acrylate, 2-hydroxypropyl (meth)acrylate, 4-hydroxybutyl (meth)acrylate, adducts of 2-hydroxyethyl (meth)acrylate with caprolactone (e.g., trade names PLACCEL FA-2 and FM-3 manufactured by Daicel Corporation), polyalkylene glycol (meth)acrylate, and (meth)acrylamide. These may be used alone or in combination of two or more.

The acrylic resin can be obtained by allowing these monomers to undergo radical copolymerization reaction by a known method.

The hydroxyl value of the acrylic resin is typically in the range of 0 to 300 mgKOH/g, preferably in the range of 30 to 200 mgKOH/g. The weight-average molecular weight of the acrylic resin is typically in the range of 1000 to 200000, preferably in the range of 3000 to 50000.

The amine value of the acrylic resin is typically in the range of 0 to 300 mgKOH/g, preferably in the range of 10 to 150 mgKOH/g.

It is also possible to synthesize an acrylic resin by radical copolymerization of a reactive functional group-containing acrylic monomer and other monomers and then react the reactive functional group with a cationic base-containing compound to introduce the cationic base into the acrylic resin. For example, an amine compound containing active hydrogen may be added to a glycidyl group of a copolymer of polymerizable unsaturated monomers including glycidyl (meth)acrylate to provide an acrylic resin with an amino group. Examples of the amine compound include primary mono- and polyamines, secondary mono- and polyamines, primary and secondary mixed polyamines, secondary mono- and polyamines having ketiminated primary amino groups, and hydroxy compounds having ketiminated primary amino groups.

The cationic electrodeposition paint of the present invention is a cationic electrodeposition paint containing the amino-containing epoxy resin (I), an amino-containing epoxy resin (II) obtained by reacting an epoxy resin having two or less functional groups and an amine compound, the amino-containing epoxy resin (II) being optionally contained, and a curing agent (particularly, a blocked polyisocyanate compound).

The average degree of polyfunctionalization (X2) of the amino-containing epoxy resin (I) expressed by formula (3) below may be 0.30 or more, preferably in the range of 0.30 to 15.00, more preferably in the range of 0.60 to 13.00, still more preferably in the range of 0.70 to 10.00, particularly preferably in the range of 0.90 to 8.00.

A cationic electrodeposition paint in which the average concentration of polyfunctionalization (Y2) of amino-containing epoxy resins contained in the cationic electrodeposition paint expressed by formula (4) below is 0.1 (mmol/g) or more (preferably in the range of 0.1 to 5, more preferably in the range of 0.4 to 3.0, still more preferably in the range of 0.4 to 2.0) can be used.

The cationic electrodeposition paint may optionally contain a curing catalyst, a pigment, a solvent such as water, and additives (a surfactant, a surface conditioner, a curing promoter, a neutralizer, etc.).

The above average concentration of polyfunctionalization (Y2) is the average concentration of polyfunctionalization (Y2) of all the amino-containing epoxy resins contained in the cationic electrodeposition paint.

Average degree of polyfunctionalization ($X2$)=number of ends in one molecule of amino-containing epoxy resin ($I$)−2 Formula (3):

Average concentration of polyfunctionalization ($Y2$) of amino-containing epoxy resins contained in cationic electrodeposition paint=average degree of polyfunctionalization ($X2$) of amino-containing epoxy resin ($I$)÷weight-average molecular weight Mw of amino-containing epoxy resin ($I$)×1000×(amount of amino-containing epoxy resin ($I$)÷amount of all amino-containing epoxy resins) Formula (4):

(Curing Agent)

The curing agent contained in the cationic electrodeposition paint of the present invention is preferably at least one selected from blocked polyisocyanate compounds and amino resins.

—Blocked Polyisocyanate Compound—

A blocked polyisocyanate compound is an addition reaction product of a polyisocyanate compound with a blocking agent. If necessary, an active hydrogen-containing compound other than the blocking agent may be reacted with the polyisocyanate compound together with the blocking agent.

As the polyisocyanate compound, a known polyisocyanate compound can be used. For example, one or more selected from the group consisting of aromatic, aliphatic, and alicyclic polyisocyanate compounds such as tolylene diisocyanate, xylylene diisocyanate, phenylene diisocyanate, diphenylmethane-2,2'-diisocyanate, diphenylmethane-2,4'-diisocyanate, diphenylmethane-4,4'-diisocyanate, crude MDI [polymethylene polyphenyl isocyanate], polymeric MDI, crude TDI, bis(isocyanatomethyl)cyclohexane, tetramethylene diisocyanate, hexamethylene diisocyanate, methylene diisocyanate, and isophorone diisocyanate and dimers, trimers, biurets, allophanates, uretdiones, uretonimines, isocyanurates, and oxadiazinetriones of these polyisocyanate compounds can be used.

In particular, aromatic polyisocyanate compounds such as tolylene diisocyanate, xylylene diisocyanate, phenylene diisocyanate, diphenylmethane-2,4'-diisocyanate, diphenylmethane-4,4'-diisocyanate, and MDI (preferably, for example, crude MDI) are more preferred for reasons of corrosion resistance.

The blocking agent is added to an isocyanate group of the polyisocyanate compound to block the polyisocyanate compound, and desirably, the blocked polyisocyanate compound resulting from the addition is stable at normal temperature (20° C.±15° C.) but dissociates the blocking agent to regenerate free isocyanate groups when heated to a baking temperature (e.g., about 80° C. to about 200° C.) of a coating film.

As the blocking agent, for example, one or more selected from the group consisting of oxime compounds such as methyl ethyl ketoxime and cyclohexanone oxime; phenol compounds such as phenol, para-t-butylphenol, and cresol; alcohol compounds such as n-butanol, 2-ethylhexanol, phenylcarbinol, methylphenylcarbinol, ethylene glycol monomethyl ether, ethylene glycol monoethyl ether, ethylene glycol monobutyl ether, diethylene glycol monoethyl ether, ethylene glycol, propylene glycol, propylene glycol monomethyl ether, and methoxymethanol; lactam compounds such as ε-caprolactam and γ-butyrolactam; active methylene compounds such as dimethyl malonate, diethyl malonate, diisopropyl malonate, ethyl acetoacetate, isopropyl acetoacetate, methyl acetoacetate, [[isopropyl acetoacetate,] and acetylacetone; pyrazole compounds such as pyrazole, 3,5-dimethylpyrazole, 3-methylpyrazole, 4-bromo-3,5-dimethylpyrazole, 4-nitro-3,5-dimethylpyrazole, 4-benzyl-3,5-dimethylpyrazole, methyl-5-methylpyrazole-3-carboxylate, 3-methyl-5-phenylpyrazole, and 3,5-dimethylpyrazole-4-carboxyanilide; mercaptan compounds such as butyl mercaptan, t-butyl mercaptan, hexyl mercaptan, t-dodecyl mercaptan, 2-mercaptobenzothiazole, thiophenol, methylthiophenol, and ethylthiophenol; acid amide compounds such as acetanilide, acetanisidide, acetotoluide, acrylamide, methacrylamide, acetamide, stearamide, and benzamide; imide compounds such as succinimide, phthalimide, and maleimide; amine compounds such as diphenylamine, phenylnaphthylamine, xylidine, N-phenylxylidine, carbazole, aniline, naphthylamine, butylamine, dibutylamine, and butylphenylamine; imidazole compounds such as imidazole and 2-ethylimidazole; urea compounds such as urea, thiourea, ethylene urea, ethylene thiourea, and diphenyl urea; carbamate ester compounds such as phenyl N-phenylcarbamate; imine compounds such as ethyleneimine and propyleneimine; sulfite compounds such as sodium bisulfite and potassium bisulfite; and the like can be used.

In particular, the blocking agent is preferably at least one selected from the group consisting of pyrazole compounds, active methylene compounds, oxime compounds, phenol compounds, lactam compounds, and alcohol compounds.

—Amino Resin—

As the amino resin, a known amino resin can be used. For example, one or more selected from the group consisting of various alkylol-containing amino resins (e.g., melamine resins, benzoguanamine resins, and urea resins) obtained by reacting an amino-containing compound such as melamine, benzoguanamine, acetoguanamine, or urea with an aldehyde compound (or an aldehyde supplier) such as formaldehyde or acetaldehyde, various alkoxyalkyl-containing amino resins obtained by reacting the alkylol-containing amino resins with a lower alcohol such as methanol, ethanol, n-butanol, or i-butanol (isobutanol), and the like can be used.

To obtain a painted article having good storage stability and excellent in finished quality and corrosion resistance, the blending ratio of the amino-containing epoxy resin (including the amino-containing epoxy resin (I) and the amino-containing epoxy resin (II)) and the curing agent in the cationic electrodeposition paint is preferably as follows: based on the total amount of the amino-containing epoxy resin and the curing agent, the content of the amino-containing epoxy resin is in the range of 30 to 90 parts by mass, preferably 40 to 85 parts by mass, and the content of the curing agent is in the range of 10 to 70 parts by mass, preferably 10 to 60 parts by mass. More preferably, the amine value of the whole resin contained in the paint is typically in the range of 20 to 150 mgKOH/g based on the resin solid content. When the blending ratio is out of the above range, either the properties of the cationic electrodeposition paint or the coating film performance may disadvantageously be impaired.

(Curing Catalyst)

In the cationic electrodeposition paint of the present invention, a known curing catalyst can be used without limitation as the curing catalyst. For example, one or more selected from the group consisting of inorganic compounds such as bismuth compounds, zinc compounds, tin compounds, titanium compounds, zirconium compounds, and yttrium compounds; organic compounds such as phosphazene compounds, amine compounds, and quaternary salt compounds; composites thereof; and the like can be used.

Although organotin compounds such as dibutyl tin dibenzoate, dioctyl tin oxide, and dibutyl tin oxide can be used as catalysts for the purpose of improving coating film curability, but in view of the recent environmental regulation against organotin compounds, it is preferable not to use organotin compounds.

As an alternative catalyst to the organotin compounds, it is more preferable to use one or more selected from the group consisting of inorganic compounds such as zinc compounds, bismuth compounds, titanium compounds, zirconium compounds, and yttrium compounds; organic compounds such as phosphazene compounds, amine compounds, and quaternary salt compounds; composites thereof; and the like as a curing catalyst, or not to substantially use a curing catalyst from the viewpoint of environmental consideration.

The cationic electrodeposition paint of the present invention preferably contains a bismuth compound as a curing catalyst in view of environmental impact and safety.

As the bismuth compound, one or more selected from the group consisting of inorganic bismuth compounds such as metallic bismuth, bismuth chloride, bismuth oxychloride, bismuth bromide, bismuth oxide, bismuth hydroxide, bismuth nitrate, bismuth nitrite, bismuth silicate, bismuth aluminosilicate, bismuth aluminate, bismuth borate, bismuth phosphate, bismuth carbonate, and bismuth subcarbonate; organic bismuth compounds such as bismuth formate, bismuth acetate, bismuth salicylate, bismuth citrate, bismuth benzoate, bismuth gallate, bismuth oxalate, bismuth lactate, bismuth oleate, bismuth methoxyacetate, bismuth dimethylolpropionate, bismuth dialkyldithiocarbamate, bismuth toluenesulfonate, and triphenylbismuth; and the like can be used.

The blending ratio of the curing catalyst in the cationic electrodeposition paint of the present invention is 0.1 to 10 parts by mass, preferably 0.5 to 6 parts by mass, based on 100 parts by mass of the resin solid content.

(Pigment)

As the pigment used for the cationic electrodeposition paint of the present invention, for example, one or more selected from the group consisting of color pigments, anti-corrosive pigments, extender pigments, and the like can be used.

These pigments are preferably formed into pigment-dispersed pastes and mixed with the paint. For example, a pigment-dispersed paste prepared by mixing additives such as a resin for pigment dispersion, a pigment, and a neutralizer and dispersing the mixture in a dispersing mixer such as a ball mill, a sand mill, or a pebble mill can be used for the cationic electrodeposition paint.

As the pigment, a known pigment may be used without particular limitation. For example, one or more selected from the group consisting of color pigments such as titanium oxide, carbon black, and colcothar; extender pigments such as clay, mica, baryta, calcium carbonate, and silica; metal compounds having functions of anticorrosive pigments, such as zinc phosphate, iron phosphate, aluminum phosphate, calcium phosphate, zinc phosphite, zinc cyanide, zinc oxide, aluminum tripolyphosphate, zinc molybdate, aluminum molybdate, calcium molybdate, aluminum phosphomolybdate, and aluminum zinc phosphomolybdate; and the like can be used.

In the present invention, when silica is used, the amount thereof is less than 5 mass %.

As the resin for pigment dispersion, a known resin may be used without particular limitation. For example, one or more selected from the group consisting of epoxy resins having hydroxyl groups and cationic groups, acrylic resins having hydroxyl groups and cationic groups, tertiary amine epoxy resins, quaternary ammonium salt epoxy resins, tertiary sulfonium salt epoxy resins, tertiary amine acrylic resins, quaternary ammonium salt acrylic resins, tertiary sulfonium salt acrylic resins, and the like can be used.

The blending amount of the pigment is preferably in the range of 1 to 100 parts by mass, particularly preferably in the range of 10 to 50 parts by mass, per 100 parts by mass of the resin solid content of the cationic electrodeposition paint.

The cationic electrodeposition paint of the present invention is, for example, the following cationic electrodeposition paint (a) or (b).

(a) A single-layer type cationic electrodeposition paint containing a curing agent and an amino-containing epoxy resin obtained by reacting at least a compound having one or more epoxy groups, a trihydric or higher phenol compound and/or a compound including a trifunctional or higher polyisocyanate, and an amine compound, the trihydric or higher phenol compound being a compound represented by structural formula (A) below:

[Chem. 12]

(A)

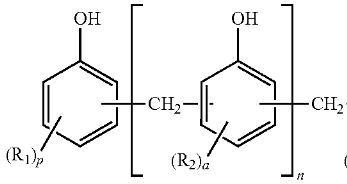

(where n is an integer of 1 to 20, p is an integer of 0 to 4, q is an integer of 0 to 3, and r is an integer of 0 to 4; $R_1$ to $R_3$ are each independently a monovalent group; $R_2$'s in n repeating units may be different from each other; when a plurality of $R_1$'s, $R_2$'s, and/or $R_3$'s are present in aromatic rings, the plurality of $R_1$'s, $R_2$'s, and/or $R_3$'s may be the same or different from each other; and $R_1$ to $R_3$ may be bonded to each other to form a ring).

(b) A single-layer type cationic electrodeposition paint containing a curing agent and an amino-containing epoxy resin obtained by reacting at least a compound having one or more epoxy groups, a trihydric or higher phenol compound and/or a compound including a trifunctional or higher polyisocyanate, and an amine compound, the trihydric or higher phenol compound being a compound represented by structural formula (A) below:

[Chem. 13]

(A)

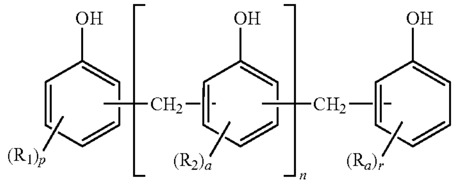

(where n is an integer of 1 to 20, p is an integer of 0 to 4, q is an integer of 0 to 3, and r is an integer of 0 to 4; $R_1$ to $R_3$ are each independently a monovalent group; $R_2$'s in n repeating units may be different from each other; when a plurality of $R_1$'s, $R_2$'s, and/or $R_3$'s are present in aromatic rings, the plurality of $R_1$'s, $R_2$'s, and/or $R_3$'s may be the same or different from each other; and $R_1$ to $R_3$ may be bonded to each other to form a ring). The content of the amino-containing epoxy resin is 71 mass % or more based on 100 mass % of resin components other than the above blocked polyisocyanate compound.

The compound having one or more epoxy groups constituting the cationic electrodeposition paint of the present invention is preferably a compound not modified with amine. The epoxy resin constituting the cationic electrodeposition paint of the present invention is preferably obtained by reacting a compound having one or more epoxy groups, a compound including a trihydric or higher phenol compound, and a compound having one or more active hydrogens in one molecule that is other than the trihydric or higher phenol compound.

Here, the compound having one or more active hydrogens in one molecule that is other than the trihydric or higher phenol compound is preferably a compound represented by structural formula (B) below:

[Chem. 14]

(B)

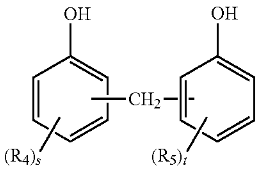

(where s is an integer of 0 to 4, and t is an integer of 0 to 4; $R_4$ and $R_5$ are each independently a monovalent group; when a plurality of $R_4$'s and/or $R_5$'s are present in aromatic rings, the plurality of $R_4$'s and/or $R_5$'s may be the same or different from each other; and $R_4$ and/or $R_5$ may be bonded to each other to form a ring), with the content ratio (mass ratio) of the trihydric or higher phenol compound to the compound represented by structural formula (B) being in the range of 1/99 to 99/1.

The trifunctional or higher polyisocyanate is preferably isocyanurate-type isocyanate and/or crude MDI.

(Method for Producing Cationic Electrodeposition Paint)

The cationic electrodeposition paint of the present invention may be produced by any method as long as the method can form a cationic electrodeposition paint containing a predetermined amino-containing epoxy resin and a predetermined curing agent.

Examples of such a method include a method for producing a cationic electrodeposition paint, including a step of producing an amino-containing epoxy resin by reacting an amine compound with an epoxy resin obtained by reacting at least a compound having one or more epoxy groups and a trihydric or higher phenol compound (excluding xylene formaldehyde resins) and/or a compound including a trifunctional or higher polyisocyanate; and a step of mixing the amino-containing epoxy resin and a curing agent to produce a cationic electrodeposition paint.

In the method for producing a cationic electrodeposition paint of the present invention, the compound having one or more epoxy groups is preferably a compound not modified with amine. The cationic electrodeposition paint to be produced is preferably a single-layer type cationic electrodeposition paint.

(Cationic Electrodeposition Method and Painted Article)

A cationic electrodeposition method using the cationic electrodeposition paint of the present invention includes a step of immersing a coating target in an electrodeposition bath composed of the cationic electrodeposition paint and a step of applying electricity using the coating target as a cathode.

A cationic electrodeposition painted article including the cationic electrodeposition paint of the present invention can be obtained by immersing a coating target in an electrodeposition paint bath containing the cationic electrodeposition paint and performing electrodeposition.

Examples of the coating target for the cationic electrodeposition paint include automobile bodies, two-wheeled vehicle parts, household appliances, and other appliances, and the coating target is not particularly limited as long as it contains a metal.

Examples of metal sheets used as the coating target include cold-rolled steel sheets, hot-dip galvanized steel sheets, electrogalvanized steel sheets, electrogalvanized-iron double-layered steel sheets, organic composite plated steel sheets, Al materials, Mg materials, and products obtained by cleaning the surfaces of these metal sheets by alkaline degreasing or the like as needed and then performing surface treatment such as phosphate chemical conversion treatment, chromate treatment, or composite oxide treatment.

The cationic electrodeposition method is carried out, for example, as follows: using, as a bath, a cationic electrodeposition paint diluted with deionized water or the like to a solid concentration of about 5 to 40 mass %, preferably 10 to 25 mass %, and adjusted to pH 4.0 to 9.0, preferably 5.5 to 7.0, the bath temperature is typically adjusted to 15° C. to 35° C., and electricity is applied at a load voltage of 100 to 400 V, preferably 150 to 350 V, using a coating target as a cathode. After the cationic electrodeposition, the coating target is usually washed thoroughly with ultrafiltrate (UF filtrate), reverse osmosis permeated water (RO water), industrial water, pure water, or the like in order to remove the extra cationic electrodeposition paint adhering to the coating target.

The thickness of the cationic electrodeposition coating film is not particularly limited, and in general, the dry thickness of the coating film can be in the range of 5 to 40 μm, preferably in the range of 10 to 30 μm. Bake drying of the electrodeposition coating film is performed using drying equipment such as an electric hot-air dryer or a gas hot-air dryer. In general, the temperature of the painted article surface is higher than 160° C. and lower than 200° C., but in the present invention, the temperature is preferably lower than 160° C., more preferably 80° C. to 130° C., particularly preferably 100° C. to 130° C., from the viewpoint of energy cost reduction. The baking time is 10 to 180 minutes, preferably 20 to 50 minutes. This bake drying can provide a cured coating film.

<Anionic Electrodeposition Paint>

The anionic electrodeposition paint of the present invention contains, as essential components, a coating film-forming resin component containing the epoxy resin of the present invention and a carboxyl-containing resin, and a curing agent. The anionic electrodeposition paint may optionally contain an epoxy phosphate ester compound, a curing catalyst, a pigment, a solvent such as water, and additives (a surfactant, a surface conditioner, a curing promoter, a neutralizer, etc.).

(Carboxyl-Containing Resin)

The carboxyl-containing resin is a resin having at least one carboxyl group in one molecule. The carboxyl-containing resin is preferably a resin further having at least one hydroxyl group. As the carboxyl-containing resin, specifically, one or more selected from the group consisting of acrylic resins, polyester resins, polyether resins, polycarbonate resins, urethane resins, and the like can be used, and an acrylic resin is suitable from the viewpoint of improving scratch resistance.

The acrylic resin can be produced by copolymerizing a mixture of a carboxyl-containing radical polymerizable unsaturated monomer (a1), a hydroxyl-containing radical polymerizable unsaturated monomer (a2), and, optionally, another radical polymerizable unsaturated monomer (a3).

As the carboxyl-containing radical polymerizable unsaturated monomer (a1), for example, one or more selected from the group consisting of acrylic acid, methacrylic acid, crotonic acid, itaconic acid, maleic acid, fumaric acid, and the like can be used.

As the hydroxyl-containing radical polymerizable unsaturated monomer (a2), for example, one or more selected from the group consisting of 2-hydroxyethyl (meth)acrylate, 2-hydroxypropyl (meth)acrylate, 3-hydroxypropyl (meth) acrylate, hydroxybutyl (meth)acrylate, in addition, PLACCEL FM1, PLACCEL FM2, PLACCEL FM3, PLACCEL FA1, PLACCEL FA2, PLACCEL FA3 (trade names, caprolactone-modified (meth)acrylate hydroxyesters manufactured by Daicel Corporation), and the like can be used.

As the other radical polymerizable unsaturated monomer (a3), a radical polymerizable unsaturated monomer different from the carboxyl-containing radical polymerizable unsaturated monomer (a1) and the hydroxyl-containing radical polymerizable unsaturated monomer (a2), for example, one or more selected from the group consisting of alkoxysilyl-containing unsaturated monomers such as γ-(meth)acryloyloxypropyltrimethoxysilane, γ-(meth)acryloyloxypropylmethyldimethoxysilane, γ-(meth) acryloyloxypropyltriethoxysilane, and vinyltrimethoxysilane; $C_1$ to $C_{18}$ alkyl or cycloalkyl esters of (meth)acrylates such as methyl (meth)acrylate, ethyl (meth) acrylate, propyl (meth)acrylate, butyl (meth)acrylate, hexyl (meth)acrylate, octyl (meth)acrylate, lauryl (meth)acrylate, 2-ethylhexyl (meth)acrylate, and cyclohexyl (meth)acrylate; aromatic vinyl monomers such as styrene; (meth)acrylamide monomers such as (meth)acrylic acid amide, N,N-dimethylol (meth)acrylamide, N,N-dimethoxymethyl (meth)acrylamide, N,N-di-n-butoxymethyl (meth)acrylamide, and N-methoxymethyl-N-methylol (meth)acrylamide; N-methylol alkyl ether-containing unsaturated monomers represented by formula: $CH_2{=}CR^2{-}CONH{-}CH_2{-}OR^1$ (where $R^1$ represents a hydrogen atom or an alkyl group having 1 to 8 carbon atoms, and $R^2$ represents a hydrogen atom or a methyl group); and the like can be used.

As the N-methylol alkyl ether-containing unsaturated monomer represented by the above formula, for example, one or more selected from the group consisting of N-methylol (meth)acrylamide, N-methoxymethyl (meth)acrylamide, N-ethoxymethyl (meth)acrylamide, N-propoxymethyl (meth)acrylamide, N-isopropoxymethyl (meth)acrylamide, N-butoxymethyl (meth)acrylamide, N-isobutoxymethyl (meth)acrylamide, N-hexoxymethyl (meth)acrylamide, N-isohexoxymethyl (meth)acrylamide, and the like can be used.

In one embodiment, the carboxyl-containing resin is an acrylic resin that can be produced by copolymerizing a mixture of a carboxyl-containing radical polymerizable unsaturated monomer (a1), a hydroxyl-containing radical polymerizable unsaturated monomer (a2), and another radical polymerizable unsaturated monomer (a3). The carboxyl-containing radical polymerizable unsaturated monomer (a1) includes acrylic acid. The hydroxyl-containing radical polymerizable unsaturated monomer (a2) includes (meth) acrylate hydroxyester (e.g., 2-hydroxyethyl (meth)acrylate, 2-hydroxypropyl (meth)acrylate, 3-hydroxypropyl (meth) acrylate, or hydroxybutyl (meth)acrylate). The other radical polymerizable unsaturated monomer (a3) includes $C_1$ to $C_{18}$ alkyl or cycloalkyl esters of one or more (meth)acrylates. In another embodiment, as compared to the above one embodiment, an N-methylol alkyl ether-containing unsaturated monomer is further contained as the other radical polymerizable unsaturated monomer (a3). In still another embodiment, as compared to the above one embodiment, an aromatic vinyl monomer (e.g., styrene) and an alkoxysilyl-containing unsaturated monomer (e.g., γ-methacryloxypropyltrimethoxysilane) are further contained as the other radical polymerizable unsaturated monomer (a3).

The blending ratio of these radical polymerizable unsaturated monomers is as follows: based on the total amount of the constituent radical polymerizable unsaturated monomers, the carboxyl-containing radical polymerizable unsaturated monomer (a1) is contained in the range of 1 to 20 mass %, preferably in the range of 4 to 10 mass %; the hydroxyl-containing radical polymerizable unsaturated monomer (a2) is contained in the range of 1 to 40 mass %, preferably in the range of 5 to 30 mass %; and the other radical polymerizable unsaturated monomer (a3) is contained in the range of 40 to 98 mass %, preferably in the range of 60 to 91 mass %.

In particular, an acrylic resin containing the N-methylol alkyl ether-containing unsaturated monomer represented by the above formula in an amount of 3 to 15 mass %, preferably 5 to 12 mass %, based on the total amount of the constituent radical polymerizable unsaturated monomers is preferred in order to improve shock resistance and adhesion of subsidiary materials.

The carboxyl-containing resin used in the anionic electrodeposition paint of the present invention can be obtained by mixing the carboxyl-containing radical polymerizable unsaturated monomer (a1), the hydroxyl-containing radical polymerizable unsaturated monomer (a2), optionally the other radical polymerizable unsaturated monomer (a3), and a polymerization initiator, and then allowing the mixture of the radical polymerizable unsaturated monomers to undergo radical polymerization reaction, for example, in an organic solvent maintained at about 50° C. to about 300° C., preferably about 60° C. to 250° C., in the presence of an inert gas such as nitrogen for about 1 hour to about 24 hours, preferably about 2 hours to about 10 hours.

As the organic solvent used in the radical polymerization reaction, for example, one or more selected from the group consisting of alcohols such as n-propanol, isopropanol, n-butanol, t-butanol, and i-butanol, ethers such as ethylene glycol monobutyl ether, methyl carbitol, 2-methoxyethanol, 2-ethoxyethanol, 2-isopropoxyethanol, 2-butoxyethanol, ethylene glycol monomethyl ether, ethylene glycol monoethyl ether, ethylene glycol monobutyl ether, 1-methoxy-2-propanol, 1-ethoxy-2-propanol, and propylene glycol monomethyl ether, and the like can be suitably used. In addition, for example, one or more selected from the group consisting of aromatic compounds such as xylene and toluene, acetone, methyl ethyl ketone, 2-pentanone, 2-hexanone, methyl isobutyl ketone, isophorone, cyclohexanone, esters such as 2-ethylhexyl acetate, benzyl acetate, cyclohexyl acetate, methyl propionate, and ethyl propionate, and the like can optionally be used in combination.

As the polymerization initiator used in the radical polymerization reaction, for example, one or more selected from the group consisting of benzoyl peroxide, di-t-butyl hydroperoxide, t-butyl hydroperoxide, cumyl peroxide, cumene hydroperoxide, t-butyl peroxybenzoate, lauryl peroxide, acetyl peroxide, azobisdimethylvaleronitrile, azobisisobutyronitrile, and the like can be used.

The weight-average molecular weight of the carboxyl-containing resin (A) obtained is preferably in the range of 5,000 to 100,000, particularly preferably in the range of 20,000 to 50,000. The acid value is suitably in the range of 5 to 180 mgKOH/g, and the hydroxyl value is suitably in the range of 3 to 150 mgKOH/g.

Here, the weight-average molecular weight is a value obtained by converting a weight-average molecular weight measured using a gel permeation chromatograph (GPC) with reference to the molecular weight of standard polystyrene.

Specifically, the measurement can be made using "HLC8120GPC" (trade name, manufactured by Tosoh Corporation) as a gel permeation chromatograph and four columns: "TSKgel G-4000HXL", "TSKgel G-3000HXL", "TSKgel G-2500HXL", and "TSKgel G-2000HXL" (trade names, all manufactured by Tosoh Corporation) under the following conditions: mobile phase, tetrahydrofuran; measurement temperature, 40° C.; flow rate, 1 mL/min; and detector, RI.

(Curing Agent)

The curing agent contained in the anionic electrodeposition paint of the present invention may be a conventionally known compound. For example, at least one selected from blocked polyisocyanate compounds and amino resins (melamine resins, benzoguanamine resins, urea resins, etc.) is suitable. Of these, one or more selected from the group consisting of blocked polyisocyanate compounds and melamine resins are preferred from the viewpoint of shock resistance, adhesion of subsidiary materials, and scratch resistance.

As the blocked polyisocyanate compound, for example, the blocked polyisocyanate compounds listed as examples of the curing agent in the cationic electrodeposition paint of the present invention can be used.

The blocked polyisocyanate compound may be a commercially available product. As such a commercially available product, for example, one or more selected from the group consisting of BURNOCK D-750, BURNOCK D-800, BURNOCK DN-950, BURNOCK DN-970, and BURNOCK DN-15-455 (trade names, manufactured by DIC Corporation), Desmodur L, Desmodur N, Desmodur HL, Desmodur IL, and Desmodur N3390 (trade names, manufactured by Bayer AG), TAKENATE D-102, TAKENATE D-202, TAKENATE D-110N, and TAKENATE D-123N (trade names, manufactured by Mitsui Chemicals, Inc.), Coronate L, Coronate HL, Coronate EH, and Coronate 203 (trade names, manufactured by Tosoh Corporation), DURANATE 24A-90CX (trade name, manufactured by Asahi Kasei Corporation), and the like can be used.

As the melamine resin, for example, one or more selected from the group consisting of partially etherified or fully etherified melamine resins obtained by partially or fully etherifying some or all methylol groups of methylolated melamine with a monohydric alcohol having 1 to 8 carbon atoms, such as methanol, ethanol, n-propanol, i-propanol, n-butanol, i-butanol, 2-ethyl butanol, or 2-ethylhexanol, and the like can be used.

The melamine resin may be a commercially available product. As such a commercially available product, for example, one or more selected from the group consisting of butyl-etherified melamine resins such as U-VAN 20SE-60 and U-VAN 225 (trade names, manufactured by Mitsui Chemicals, Inc.), and SUPER BECKAMINE G840 and SUPER BECKAMINE G821 (trade names, manufactured by DIC Corporation); methyl-etherified melamine resins such as SUMIMAL M-100, SUMIMAL M-40S, and SUMIMAL M-55 (trade names, manufactured by Sumitomo Chemical Co., Ltd.), CYMEL 202, CYMEL 232, CYMEL 235, CYMEL 254, CYMEL 266, CYMEL 272, CYMEL 303, CYMEL 325, CYMEL 327, CYMEL 350, and CYMEL 370 (trade names, manufactured by Allnex), NIKALAC MS17, NIKALAC MX15, NIKALAC MX430, and NIKALAC MX600 (trade names, manufactured by Sanwa Chemical Co., Ltd.), and Resimene 741 (trade name, manufactured by Monsanto Company); methyl- and isobutyl-etherified melamine resins such as CYMEL 232S, CYMEL 238, and CYMEL 1130 (trade names, manufactured by Allnex) and SUMIMAL M66B (trade name, manufactured by Sumitomo Chemical Co., Ltd.); methyl- and n-butyl-etherified melamine resins such as CYMEL XV805 (trade name, manufactured by Mitsui Cytec Ltd.) and NIKALAC MS95 (trade name, manufactured by Sanwa Chemical Co., Ltd.); and the like can be used.

From the viewpoint of shock resistance and scratch resistance, the blending ratio of the carboxyl-containing resin and the curing agent in the anionic electrodeposition paint is preferably as follows: based on 100 parts by mass of the total solid content of the carboxyl-containing resin and the curing agent, the content of the carboxyl-containing resin is 50 to 90 parts by mass, preferably 60 to 75 parts by mass, and the content of the curing agent is 10 to 50 parts by mass, preferably 25 to 40 parts by mass.

(Epoxy Phosphate Ester Compound)

The anionic electrodeposition paint of the present invention can optionally contain an epoxy phosphate ester compound obtained by adding a phosphoric acid compound to an epoxy resin. The presence of an epoxy phosphate ester compound can improve shock resistance.

As the epoxy resin, the epoxy resin according to the first embodiment of the present invention can be used. Alternatively, for example, a bisphenol epoxy resin, a novolac epoxy resin, a modified epoxy resin obtained by reacting an epoxy group or a hydroxyl group in these epoxy resins with a modifier, or the like can be used.

Examples of the phosphoric acid compound include orthophosphoric acid and pyrophosphoric acid.

The reaction of the epoxy resin and the phosphoric acid compound can be carried out at 50° C. to 180° C., preferably at 80° C. to 120° C., in the presence or absence of a catalyst.

The epoxy phosphate ester compound may be a commercially available product. As such a commercially available product, for example, one or more selected from the group consisting of XU-8096.07, XU-71899.00, XQ-82908.00, XQ-82919.00, DER620-PP50, DER621-EB50, and DER621-PP50 (trade names, manufactured by Dow Chemical Japan Ltd.), Epotohto ZX1300 and ZX1300-1 (trade names, manufactured by NIPPON STEEL Chemical & Material Co., Ltd.), and the like can be used.

When the anionic electrodeposition paint contains an epoxy phosphate ester compound, the blending ratio thereof in terms of the solid mass of the epoxy phosphate ester compound based on 100 parts by mass of the total solid content of a resin containing a hydroxyl group and a carboxyl group and a crosslinking agent is in the range of 0.05 to 10.0 parts by mass, preferably in the range of 0.1 to 5.0 parts by mass, more preferably in the range of 0.5 to 3.0 parts by mass, from the viewpoint of paint stability, weather resistance, and shock resistance.

(Curing Catalyst)

As the curing catalyst contained in the anionic electrodeposition paint of the present invention, a conventionally known curing catalyst can be used without limitation. For example, curing catalysts mentioned for the cationic electrodeposition paint of the present invention are suitable.

In the anionic electrodeposition paint of the present invention, as the curing catalyst, for example, one or more selected from the group consisting of n-butylbenzenesulfonic acid, n-amylbenzenesulfonic acid, n-octylbenzenesulfonic acid, n-dodecylbenzenesulfonic acid, n-octadecylbenzenesulfonic acid, n-dibutylbenzenesulfonic acid, i-propylnaphthalenesulfonic acid, dodecyl naphthalenesulfonic acid, dinonylnaphthalenesulfonic acid, dinonylnaphthalenedisulfonic acid, amine-neutralized products of these sulfonic acids, and the like can be used.

The blending ratio of the curing catalyst in the anionic electrodeposition paint of the present invention is 0.1 to 10 parts by mass, preferably 0.5 to 6 parts by mass, based on 100 parts by mass of the resin solid content.

(Pigment)

In the anionic electrodeposition paint of the present invention, one or more selected from the group consisting of conventionally known color pigments, anticorrosive pigments, extender pigments, and the like can be used without limitation. For example, pigments that can be contained in the cationic electrodeposition paint of the present invention are suitable. These pigments, as in the case of the cationic electrodeposition paint of the present invention, are preferably formed into pigment-dispersed pastes and then mixed with the paint.

(Neutralizer)

The anionic electrodeposition paint of the present invention may contain a basic compound for the purpose of neutralizing the carboxyl-containing resin and/or adjusting the pH of an anionic electrodeposition paint bath. Specifically, one or more selected from the group consisting of primary monoamines such as ethylamine, propylamine, butylamine, benzylamine, monoethanolamine, neopentanolamine, 2-aminopropanol, and 3-aminopropanol; secondary monoamines such as diethylamine, diethanolamine, di-n- or di-iso-propanolamine, N-methylethanolamine, and N-ethylethanolamine; tertiary monoamines such as dimethylethanolamine, trimethylamine, triethylamine, triisopropylamine, methyldiethanolamine, and dimethylaminoethanol; polyamines such as diethylenetriamine, hydroxyethylaminoethylamine, ethylaminoethylamine, and methylaminopropylamine; and the like can be used. The blending ratio of the basic compound is preferably in the range of 0.1 to 1.2 equivalents, more preferably in the range of 0.2 to 0.8 equivalents, in terms of neutralization equivalent.

(Surfactant)

In the anionic electrodeposition paint of the present invention, a surfactant can be used to improve the water dispersibility of the carboxyl-containing resin and/or paint stability. Specifically, any of a nonionic surfactant, an anionic surfactant, a cationic surfactant, and an amphoteric surfactant can be used.

As the nonionic surfactant, for example, one or more selected from the group consisting of polyoxyethylene alkyl ethers, polyoxyethylene alkyl allyl ethers, polyoxyethylene derivatives (e.g., polyoxyethylene distyrenated phenyl ether and polyoxyethylene tribenzylphenyl ether), sorbitan fatty acid esters, polyoxyethylene sorbitan fatty acid esters, glycerol fatty acid esters, polyoxyethylene fatty acid esters, polyoxyethylene alkylamines, alkylalkanolamides, and the like can be used.

As the anionic surfactant, for example, one or more selected from the group consisting of fatty acid salts, alkyl sulfate ester salts, alkylbenzene sulfonate salts, alkyl phosphate salts, and the like can be used.

Examples of the cationic surfactant include alkylamine salts and quaternary ammonium salts. As the amphoteric surfactant, for example, one or more selected from the group consisting of alkylbetaine and the like can be used.

The anionic electrodeposition paint of the present invention can be adjusted to have a solid concentration of about 5 to 40 mass %, preferably 10 to 25 mass %, and a pH in the range of 7.0 to 10.0, preferably in the range of 7.5 to 9.5.

(Anionic Electrodeposition Method)

An anionic electrodeposition method using the anionic electrodeposition paint of the present invention includes a step of immersing a coating target in an electrodeposition bath composed of the anionic electrodeposition paint and a step of applying electricity using the coating target as an anode.

Examples of the coating target for the anionic electrodeposition paint include building materials, household appliances, and other appliances, and the coating target is not particularly limited as long as it contains a metal. Examples include building materials, aluminum sashes, fittings, base materials for verandas, roofing materials, storm doors, doors, shojis, door pockets, sunrooms, and parts thereof.

The anionic electrodeposition method is carried out, for example, as follows: using an anionic electrodeposition paint as a bath, the bath temperature is typically adjusted to 15° C. to 35° C., and electricity is applied at a load voltage of 100 to 400 V using a coating target such as aluminum or an aluminum alloy as an anode in the bath. After the anionic electrodeposition, the coating target may be but need not be washed thoroughly with water in order to remove the extra anionic electrodeposition paint adhering to the aluminum or aluminum alloy as described above.

The thickness of the anionic coating film is not particularly limited, and in general, the dry thickness of the coating film can be in the range of 1 to 40 μm, preferably in the range of 5 to 30 μm. Bake drying of the electrodeposition coating film can be performed using drying equipment such as an electric hot-air dryer or a gas hot-air dryer. In general, the bake drying is performed typically at a drying temperature of 140° C. to 220° C., preferably 170° C. to 200° C., but in the present invention, the drying temperature is preferably lower than 160° C., more preferably 80° C. to 130° C., particularly preferably 100° C. to 130° C., from the viewpoint of energy cost reduction. The baking time is 10 to 180 minutes, preferably 20 to 50 minutes. This bake drying can provide a cured coating film.

EXAMPLES

The present invention will now be described in more detail with reference to Examples, but the present invention is not limited to these Examples. Unless otherwise specified, "%" means "mass %", and "parts" means parts by mass.

Amino-Containing Epoxy Resin

Comparative Example 1-1

In a reaction vessel equipped with a stirrer, a thermometer, a nitrogen inlet tube, and a reflux condenser, 1893.8 parts of a bisphenol A epoxy resin (epoxy compound), 41.6 parts of a polyfunctionalizing agent α (polyfunctionalizing agent), 10.5 parts of a compound γ, 603.5 parts of bisphenol A, 1.0 parts of TBAB (tetrabutylammonium bromide; catalyst), and 283.2 parts of methyl isobutyl ketone (solvent) were placed and allowed to react at 160° C. until an epoxy equivalent of 592 was reached, and the resulting reaction product was diluted with methyl isobutyl ketone to a solid content of 80%. Next, 386.4 parts of diethanolamine and 185.1 parts of a ketiminated product (containing 10% solvent, hereinafter referred to as a "90% product") of diethylenetriamine were added and allowed to react at 120° C. for 3 hours. Furthermore, methyl isobutyl ketone was added to obtain a polyfunctional epoxy resin (A-1) solution having an amino group and a solid content of 75%.

The epoxy resin (A-1) obtained had an amine value of 92 mgKOH/g, an average degree of polyfunctionalization (X1) of 0.15, an average concentration of polyfunctionalization (Y1) of 0.101, and a solubility parameter of 10.7.

Example 1-1

In a reaction vessel equipped with a stirrer, a thermometer, a nitrogen inlet tube, and a reflux condenser, 1898.7 parts of a bisphenol A epoxy resin (epoxy compound), 83.0 parts of a polyfunctionalizing agent α (polyfunctionalizing agent), 21.0 parts of a compound γ, 514.8 parts of bisphenol A, 1.0 parts of TBAB (tetrabutylammonium bromide; catalyst), and 279.7 parts of methyl isobutyl ketone (solvent) were placed and allowed to react at 160° C. until an epoxy equivalent of 546 was reached, and the resulting reaction product was diluted with methyl isobutyl ketone to a solid content of 80%. Next, 418.5 parts of diethanolamine and 184.5 parts of a ketiminated product (90% product) of diethylenetriamine were added and allowed to react at 120° C. for 3 hours. Furthermore, methyl isobutyl ketone was added to obtain a polyfunctional epoxy resin (A-2) solution having an amino group and a solid content of 75%.

The epoxy resin (A-2) obtained had an amine value of 98 mgKOH/g, an average degree of polyfunctionalization (X1) of 0.30, an average concentration of polyfunctionalization (Y1) of 0.202, and a solubility parameter of 10.7.

Example 1-2

In a reaction vessel equipped with a stirrer, a thermometer, a nitrogen inlet tube, and a reflux condenser, 1908.8 parts of a bisphenol A epoxy resin (epoxy compound), 167.6 parts of a polyfunctionalizing agent α (polyfunctionalizing agent), 42.4 parts of a compound γ, 333.7 parts of bisphenol A, 1.0 parts of TBAB (tetrabutylammonium bromide; catalyst), and 272.5 parts of methyl isobutyl ketone (solvent) were placed and allowed to react at 160° C. until an epoxy equivalent of 468 was reached, and the resulting reaction product was diluted with methyl isobutyl ketone to a solid content of 80%. Next, 482.9 parts of diethanolamine and 186.1 parts of a ketiminated product (90% product) of diethylenetriamine were added and allowed to react at 120° C. for 3 hours. Furthermore, methyl isobutyl ketone was added to obtain a polyfunctional epoxy resin (A-3) solution having an amino group and a solid content of 75%.

The epoxy resin (A-3) obtained had an amine value of 109 mgKOH/g, an average degree of polyfunctionalization (X1) of 0.61, an average concentration of polyfunctionalization (Y1) of 0.407, and a solubility parameter of 10.7.

Example 1-3

In a reaction vessel equipped with a stirrer, a thermometer, a nitrogen inlet tube, and a reflux condenser, 1914.7 parts of a bisphenol A epoxy resin (epoxy compound), 219.6 parts of a polyfunctionalizing agent α (polyfunctionalizing agent), 55.6 parts of a compound γ, 228 parts of bisphenol A, 1.0 parts of TBAB (tetrabutylammonium bromide; catalyst), and 268.6 parts of methyl isobutyl ketone (solvent) were placed and allowed to react at 160° C. until an epoxy equivalent of 434 was reached, and the resulting reaction product was diluted with methyl isobutyl ketone to a solid content of 80%. Next, 519.2 parts of diethanolamine and 181.3 parts of a ketiminated product (90% product) of diethylenetriamine were added and allowed to react at 120° C. for 3 hours. Furthermore, methyl isobutyl ketone was added to obtain a polyfunctional epoxy resin (A-4) solution having an amino group and a solid content of 75%.

The epoxy resin (A-4) obtained had an amine value of 115 mgKOH/g, an average degree of polyfunctionalization (X1) of 0.81, an average concentration of polyfunctionalization (Y1) of 0.533, and a solubility parameter of 10.8.

Example 1-4

In a reaction vessel equipped with a stirrer, a thermometer, a nitrogen inlet tube, and a reflux condenser, 1927.7 parts of a bisphenol A epoxy resin (epoxy compound), 353.5 parts of a polyfunctionalizing agent α (polyfunctionalizing agent), 89.5 parts of a compound γ, 0.9 parts of TBAB (tetrabutylammonium bromide; catalyst), and 263.4 parts of methyl isobutyl ketone (solvent) were placed and allowed to react at 160° C. until an epoxy equivalent of 393 was reached, and the resulting reaction product was diluted with methyl isobutyl ketone to a solid content of 80%. Next, 564.4 parts of diethanolamine and 187.1 parts of a ketiminated product (90% product) of diethylenetriamine were added and allowed to react at 120° C. for 3 hours. Furthermore, methyl isobutyl ketone was added to obtain a polyfunctional epoxy resin (A-5) solution having an amino group and a solid content of 75%.

The epoxy resin (A-5) obtained had an amine value of 124 mgKOH/g, an average degree of polyfunctionalization (X1) of 1.50, an average concentration of polyfunctionalization (Y1) of 0.858, and a solubility parameter of 10.8.

Example 1-5

In a reaction vessel equipped with a stirrer, a thermometer, a nitrogen inlet tube, and a reflux condenser, 1928.0 parts of a bisphenol A epoxy resin (epoxy compound), 386.6 parts of a polyfunctionalizing agent α (polyfunctionalizing agent), 97.9 parts of a compound γ, 1.0 parts of TBAB (tetrabutylammonium bromide; catalyst), and 268.0 parts of methyl isobutyl ketone (solvent) were placed and allowed to react at 160° C. until an epoxy equivalent of 428 was reached, and the resulting reaction product was diluted with methyl isobutyl ketone to a solid content of 80%. Next, 524 parts of diethanolamine and 183.0 parts of a ketiminated product (90% product) of diethylenetriamine were added and allowed to react at 120° C. for 3 hours. Furthermore, methyl isobutyl ketone was added to obtain a polyfunctional epoxy resin (A-6) solution having an amino group and a solid content of 75%.

The epoxy resin (A-6) obtained had an amine value of 116 mgKOH/g, an average degree of polyfunctionalization (X1) of 2.02, an average concentration of polyfunctionalization (Y1) of 0.939, and a solubility parameter of 10.8.

Example 1-6

In a reaction vessel equipped with a stirrer, a thermometer, a nitrogen inlet tube, and a reflux condenser, 1928.4 parts of a bisphenol A epoxy resin (epoxy compound), 424.9 parts of a polyfunctionalizing agent α (polyfunctionalizing agent), 107.6 parts of a compound γ, 1.0 parts of TBAB (tetrabutylammonium bromide; catalyst), and 273.4 parts of methyl isobutyl ketone (solvent) were placed and allowed to react at 160° C. until an epoxy equivalent of 475 was reached, and the resulting reaction product was diluted with methyl isobutyl ketone to a solid content of 80%. Next, 475.5 parts of diethanolamine and 183.2 parts of a ketiminated product (90% product) of diethylenetriamine were added and allowed to react at 120° C. for 3 hours. Furthermore, methyl isobutyl ketone was added to obtain a polyfunctional epoxy resin (A-7) solution having an amino group and a solid content of 75%.

The epoxy resin (A-7) obtained had an amine value of 108 mgKOH/g, an average degree of polyfunctionalization (X1) of 3.02, an average concentration of polyfunctionalization (Y1) of 1.032, and a solubility parameter of 10.7.

Example 1-7

In a reaction vessel equipped with a stirrer, a thermometer, a nitrogen inlet tube, and a reflux condenser, 1925.8 parts of a bisphenol A epoxy resin (epoxy compound), 431.2 parts of a polyfunctionalizing agent β (polyfunctionalizing agent), 56.0 parts of a compound γ, 1.0 parts of TBAB (tetrabutylammonium bromide; catalyst), and 268.1 parts of methyl isobutyl ketone (solvent) were placed and allowed to react at 160° C. until an epoxy equivalent of 429 was reached, and the resulting reaction product was diluted with methyl isobutyl ketone to a solid content of 80%. Next, 523.5 parts of diethanolamine and 182.8 parts of a ketiminated product (90% product) of diethylenetriamine were added and allowed to react at 120° C. for 3 hours. Furthermore, methyl isobutyl ketone was added to obtain a polyfunctional epoxy resin (A-8) solution having an amino group and a solid content of 75%.

The epoxy resin (A-8) obtained had an amine value of 116 mgKOH/g, an average degree of polyfunctionalization (X1) of 3.06, an average concentration of polyfunctionalization (Y1) of 1.129, and a solubility parameter of 10.7.

Example 1-8

In a reaction vessel equipped with a stirrer, a thermometer, a nitrogen inlet tube, and a reflux condenser, 1928.7 parts of a bisphenol A epoxy resin (epoxy compound), 447.5 parts of a polyfunctionalizing agent α (polyfunctionalizing agent), 113.3 parts of a compound γ, 1.0 parts of TBAB (tetrabutylammonium bromide; catalyst), and 276.6 parts of methyl isobutyl ketone (solvent) were placed and allowed to react at 160° C. until an epoxy equivalent of 507 was reached, and the resulting reaction product was diluted with methyl isobutyl ketone to a solid content of 80%. Next, 445.3 parts of diethanolamine and 188.0 parts of a ketiminated product (90% product) of diethylenetriamine were added and allowed to react at 120° C. for 3 hours. Furthermore, methyl isobutyl ketone was added to obtain a polyfunctional epoxy resin (A-9) solution having an amino group and a solid content of 75%.

The epoxy resin (A-9) obtained had an amine value of 103 mgKOH/g, an average degree of polyfunctionalization (X1) of 4.04, an average concentration of polyfunctionalization (Y1) of 1.087, and a solubility parameter of 10.7.

Example 1-9

In a reaction vessel equipped with a stirrer, a thermometer, a nitrogen inlet tube, and a reflux condenser, 1929.1 parts of a bisphenol A epoxy resin (epoxy compound), 485.3 parts of a polyfunctionalizing agent α (polyfunctionalizing agent), 122.8 parts of a compound γ, 1.0 parts of TBAB (tetrabutylammonium bromide; catalyst), and 281.9 parts of methyl isobutyl ketone (solvent) were placed and allowed to react at 160° C. until an epoxy equivalent of 569 was reached, and the resulting reaction product was diluted with methyl isobutyl ketone to a solid content of 80%. Next, 399.1 parts of diethanolamine and 183.6 parts of a ketiminated product (90% product) of diethylenetriamine were added and allowed to react at 120° C. for 3 hours. Furthermore, methyl isobutyl ketone was added to obtain a polyfunctional epoxy resin (A-10) solution having an amino group and a solid content of 75%.

The epoxy resin (A-10) obtained had an amine value of 94 mgKOH/g, an average degree of polyfunctionalization (X1) of 8.00, an average concentration of polyfunctionalization (Y1) of 1.179, and a solubility parameter of 10.6.

Example 1-10

In a reaction vessel equipped with a stirrer, a thermometer, a nitrogen inlet tube, and a reflux condenser, 1929.2 parts of a bisphenol A epoxy resin (epoxy compound), 499.7 parts of a polyfunctionalizing agent α (polyfunctionalizing agent), 126.5 parts of a compound γ, 1.0 parts of TBAB (tetrabutylammonium bromide; catalyst), and 283.9 parts of methyl isobutyl ketone (solvent) were placed and allowed to react at 160° C. until an epoxy equivalent of 597 was reached, and the resulting reaction product was diluted with methyl isobutyl ketone to a solid content of 80%. Next, 381.1 parts of diethanolamine and 182.6 parts of a ketiminated product (90% product) of diethylenetriamine were added and allowed to react at 120° C. for 3 hours. Furthermore, methyl isobutyl ketone was added to obtain a polyfunctional epoxy resin (A-11) solution having an amino group and a solid content of 75%.

The epoxy resin (A-11) obtained had an amine value of 91 mgKOH/g, an average degree of polyfunctionalization (X1) of 12.04, an average concentration of polyfunctionalization (Y1) of 1.214, and a solubility parameter of 10.5.

Example 1-11

In a reaction vessel equipped with a stirrer, a thermometer, a nitrogen inlet tube, and a reflux condenser, 1651.5 parts of a bisphenol A epoxy resin (epoxy compound), 859.1 parts of HMDI nurate, 5.0 parts of DMBnAm (N,N-dimethylbenzylamine; catalyst), and 273.9 parts of methyl isobutyl ketone (solvent) were placed and allowed to react at 160° C. until an epoxy equivalent of 537 was reached, and the resulting reaction product was diluted with methyl isobutyl ketone to a solid content of 80%. Next, 424.5 parts of diethanolamine and 187.2 parts of a ketiminated product (90% product) of diethylenetriamine were added and allowed to react at 120° C. for 3 hours. Furthermore, methyl isobutyl ketone was added to obtain a polyfunctional epoxy resin (A-12) solution having an amino group and a solid content of 75%.

The epoxy resin (A-12) obtained had an amine value of 99 mgKOH/g, an average degree of polyfunctionalization (X1) of 1.54, an average concentration of polyfunctionalization (Y1) of 0.677, and a solubility parameter of 10.8.

Example 1-12

In a reaction vessel equipped with a stirrer, a thermometer, a nitrogen inlet tube, and a reflux condenser, 1846.4 parts of a bisphenol A epoxy resin (epoxy compound), 413.2 parts of crude MDI, 262.0 parts of monomeric MDI, 5.1 parts of DMBnAm (N,N-dimethylbenzylamine; catalyst), and 280.3 parts of methyl isobutyl ketone (solvent) were placed and allowed to react at 160° C. until an epoxy equivalent of 556 was reached, and then 47.0 parts of bisphenol A was further added and allowed to react at 160° C. until an epoxy equivalent of 623 was reached. The resulting reaction product was diluted with methyl isobutyl ketone to a solid content of 80%. Next, 367.8 parts of diethanolamine and 183.4 parts of a ketiminated product (90% product) of diethylenetriamine were added and allowed to react at 120° C. for 3 hours. Furthermore, methyl isobutyl ketone was added to obtain a polyfunctional epoxy resin (A-13) solution having an amino group and a solid content of 75%.

The epoxy resin (A-13) obtained had an amine value of 89 mgKOH/g, an average degree of polyfunctionalization (X1) of 1.52, an average concentration of polyfunctionalization (Y1) of 0.592, and a solubility parameter of 10.7.

Comparative Example 1-2

In a reaction vessel equipped with a stirrer, a thermometer, a nitrogen inlet tube, and a reflux condenser, 1914.3 parts of a bisphenol A epoxy resin (epoxy compound), 609.7 parts of bisphenol A, 3.8 parts of dimethylbenzylamine (catalyst), and 280.4 parts of methyl isobutyl ketone (solvent) were placed and allowed to react at 160° C. until an epoxy equivalent of 555 was reached, and the resulting reaction product was diluted with methyl isobutyl ketone to a solid content of 80%. Next, 410.9 parts of diethanolamine and 187.5 parts of a ketiminated product (90% product) of diethylenetriamine were added and allowed to react at 120° C. for 3 hours. Furthermore, methyl isobutyl ketone was added to obtain a polyfunctional epoxy resin (A-14) solution having an amino group and a solid content of 75%.

The epoxy resin (A-14) obtained had an amine value of 97 mgKOH/g, an average degree of polyfunctionalization (X1) of 0.15, an average concentration of polyfunctionalization (Y1) of 0.121, and a solubility parameter of 10.7.

Example 1-13

In a reaction vessel equipped with a stirrer, a thermometer, a nitrogen inlet tube, and a reflux condenser, 2081.6 parts of a bisphenol A epoxy resin (epoxy compound), 292.1 parts of bisphenol A, 3.6 parts of dimethylbenzylamine (catalyst), and 263.7 parts of methyl isobutyl ketone (solvent) were placed and allowed to react at 160° C. until an epoxy equivalent of 397 was reached, and the resulting reaction product was diluted with methyl isobutyl ketone to a solid content of 80%. Next, 560.4 parts of diethanolamine and 190.0 parts of a ketiminated product (90% product) of diethylenetriamine were added and allowed to react at 120° C. for 3 hours. Furthermore, methyl isobutyl ketone was added to obtain a polyfunctional epoxy resin (A-15) solution having an amino group and a solid content of 75%.

The epoxy resin (A-15) obtained had an amine value of 124 mgKOH/g, an average degree of polyfunctionalization (X1) of 1.50, an average concentration of polyfunctionalization (Y1) of 2.133, and a solubility parameter of 10.8.

Comparative Example 1-3

In a reaction vessel equipped with a stirrer, a thermometer, a nitrogen inlet tube, and a reflux condenser, 1902.4 parts of a bisphenol A epoxy resin (epoxy compound), 28.7 parts of a polyfunctionalizing agent α (polyfunctionalizing agent), 7.3 parts of a compound γ, 585.2 parts of bisphenol A, 3.8 parts of dimethylbenzylamine (catalyst), and 280.4 parts of methyl isobutyl ketone (solvent) were placed and allowed to react at 160° C. until an epoxy equivalent of 554 was reached, and the resulting reaction product was diluted with methyl isobutyl ketone to a solid content of 80%. Next, 411.6 parts of diethanolamine and 186.9 parts of a ketiminated product (90% product) of diethylenetriamine were added and allowed to react at 120° C. for 3 hours. Furthermore, methyl isobutyl ketone was added to obtain a polyfunctional epoxy resin (A-16) solution having an amino group and a solid content of 75%.

The epoxy resin (A-16) obtained had an amine value of 97 mgKOH/g, an average degree of polyfunctionalization (X1) of 0.15, an average concentration of polyfunctionalization (Y1) of 0.115, and a solubility parameter of 10.7.

Example 1-14

In a reaction vessel equipped with a stirrer, a thermometer, a nitrogen inlet tube, and a reflux condenser, 1944.2 parts of a bisphenol A epoxy resin (epoxy compound), 300.9 parts of a polyfunctionalizing agent α (polyfunctionalizing agent), 76.2 parts of a compound γ, 69.7 parts of bisphenol A, 3.6 parts of dimethylbenzylamine (catalyst), and 265.7 parts of methyl isobutyl ketone (solvent) were placed and allowed to react at 160° C. until an epoxy equivalent of 410 was reached, and the resulting reaction product was diluted with methyl isobutyl ketone to a solid content of 80%. Next, 544.4 parts of diethanolamine and 186.0 parts of a ketiminated product (90% product) of diethylenetriamine were added and allowed to react at 120° C. for 3 hours. Furthermore, methyl isobutyl ketone was added to obtain a polyfunctional epoxy resin (A-17) solution having an amino group and a solid content of 75%.

The epoxy resin (A-17) obtained had an amine value of 120 mgKOH/g, an average degree of polyfunctionalization (X1) of 1.51, an average concentration of polyfunctionalization (Y1) of 0.986, and a solubility parameter of 10.8.

Comparative Example 1-4

In a reaction vessel equipped with a stirrer, a thermometer, a nitrogen inlet tube, and a reflux condenser, 1885.5 parts of a bisphenol A epoxy resin (epoxy compound), 757.8 parts of bisphenol A, 1.1 parts of TBAB (tetrabutylammonium bromide; catalyst), and 293.0 parts of methyl isobutyl ketone (solvent) were placed and allowed to react at 160° C. until an epoxy equivalent of 775 was reached, and the resulting reaction product was diluted with methyl isobutyl ketone to a solid content of 80%.

Next, 291.7 parts of diethanolamine and 187.1 parts of a ketiminated product (90% product) of diethylenetriamine and methyl isobutyl ketone were added and allowed to react at 120° C. for 4 hours. Furthermore, methyl isobutyl ketone was added to obtain a non-polyfunctional linear epoxy resin solution (A-18) having an amino group and a solid content of 75%.

The epoxy resin (A-18) obtained had an amine value of 76 mgKOH/g, an average degree of polyfunctionalization (X1) of 0, an average concentration of polyfunctionalization (Y1) of 0, and a solubility parameter of 10.8.

The components used in producing the epoxy resins are as follows.

(Epoxy Compound)

Bisphenol A Epoxy Resin jER828EL: trade name, manufactured by Mitsubishi Chemical Corporation (number of functional groups, 2; epoxy equivalent, 187; weight-average molecular weight, 375)

(Polyfunctionalizing Agent)

Polyfunctionalizing Agent α

A mixture of compounds represented by structural formula (A) below where p=q=r=0, and $R_1=R_2=R_3=H$. The content ratios of the compounds with values of n being 1 or greater relative to the total amount of the compounds are shown in Table 1. Average number of functional groups, 8.4; weight-average molecular weight, 878.

Polyfunctionalizing agent β

A mixture of compounds represented by structural formula (A) below where p=q=r=0, and $R_1=R_2=R_3=H$. The content ratios of the compounds with values of n being 1 or greater relative to the total amount of the compounds are shown in Table 1. Average number of functional groups, 11.37; weight-average molecular weight, 1193.

[Chem. 15]

(A)

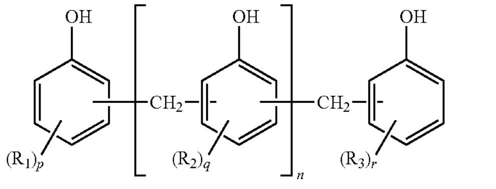

TABLE 1

| Value of n in formula (3) | Number of functional groups | Molecular weight | Branching agent α Content ratio (mass %) | Branching agent β Content ratio (mass %) |
|---|---|---|---|---|
| n = 1 | 3 | 306 | 3.1 | 0.1 |
| n = 2 | 4 | 412 | 4.2 | 0.2 |
| n = 3 | 5 | 518 | 5.3 | 0.5 |
| n = 4 | 6 | 624 | 6.3 | 1.5 |
| n = 5 | 7 | 730 | 7.7 | 3.1 |
| n = 6 | 8 | 836 | 7.9 | 5.2 |
| n = 7 | 9 | 942 | 8.9 | 9.1 |
| n = 8 | 10 | 1048 | 10.6 | 9.8 |
| n = 9 | 11 | 1154 | 11.0 | 11.1 |
| n = 10 | 12 | 1260 | 8.5 | 13.3 |
| n = 11 | 13 | 1366 | 7.7 | 12.0 |
| n = 12 | 14 | 1472 | 6.1 | 10.1 |
| n = 13 | 15 | 1578 | 5.4 | 9.5 |
| n = 14 | 16 | 1684 | 3.1 | 7.4 |
| n = 15 | 17 | 1790 | 2.7 | 5.1 |
| n = 16 | 18 | 1896 | 1.5 | 2.0 |
| | Total | | 100.0 | 100.0 |

HMDI nurate: a compound that is isocyanurate-modified hexamethylene diisocyanate, the number of functional groups, 3.93; weight-average molecular weight, 817

Crude MDI: a compound represented by structural formula (C) below where n is an integer of 1 or greater, the number of NCO functional groups, 4.46; weight-average molecular weight, 573

[Chem. 16]

(C)

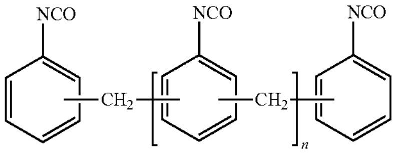

(Compound Having One or More Active Hydrogens in One Molecule that is Other than Trihydric or Higher Phenol Compound)

Compound γ

A compound represented by structural formula (B) below where s=t=0, and $R_4$=$R_5$=H (molecular weight: 200)

[Chem. 17]

(B)

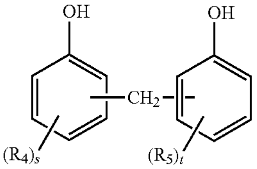

(In the formula, s=0, t=0, and $R_4$=$R_5$=H.)

Bisphenol A

[Chem. 18]

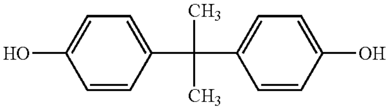

(Diisocyanate Compound)

Monomeric MDI

A compound represented by structural formula (C) below where n=0, the number of NCO functional groups, 2; molecular weight, 250

[Chem. 19]

(C)

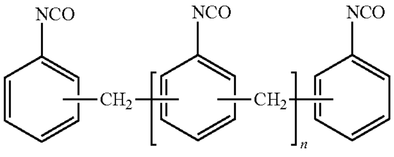

[Cationic Electrodeposition Paint]

<Production of Resin for Pigment Dispersion>

In a flask equipped with a stirrer, a thermometer, a dropping funnel, and a reflux condenser, 1010 parts of a bisphenol A epoxy resin (epoxy equivalent, 190; weight-average molecular weight, 350), 390 parts of bisphenol A, 240 parts of PLACCEL 212 (trade name, polycaprolactone diol manufactured by Daicel [Chemical Industries, Ltd.] Corporation; weight-average molecular weight, about 1,250), and 0.2 parts of dimethylbenzylamine were placed and allowed to react at 130° C. until an epoxy equivalent of about 1090 was reached. Next, 134 parts of dimethylethanolamine and 150 parts of an aqueous lactic acid solution having a concentration of 90% were added and allowed to react at 90° C. until epoxy groups disappeared. Next, propylene glycol monomethyl ether was added to adjust the solid content, thereby obtaining a resin for pigment dispersion (R) containing a quaternary ammonium base and having a solid content of 60%.

<Production of Pigment-Dispersed Paste>

(Pigment-Dispersed Paste (P1))

In a ball mill, 8.3 parts (solid content: 5 parts) of the resin for pigment dispersion (R) containing a quaternary ammonium base and having a solid content of 60%, 14.5 parts of titanium oxide, 6.0 parts of purified clay, 0.3 parts of carbon black, 3 parts of bismuth hydroxide, and 20.3 parts of deionized water were placed and dispersed for 20 hours to obtain a pigment-dispersed paste (P1) having a solid content of 55%.

(Pigment-Dispersed Paste (P2))

In a ball mill, 8.3 parts (solid content: 5 parts) of the resin for pigment dispersion (R) containing a quaternary ammonium base and having a solid content of 60%, 14.5 parts of titanium oxide, 7.0 parts of purified clay, 0.3 parts of carbon black, 2 parts of dioctyl tin oxide, and 20.3 parts of deionized water were placed and dispersed for 20 hours to obtain a pigment-dispersed paste (P2) having a solid content of 55%.

<Production of Blocked Polyisocyanate Compound (BNCO (B1))>

In a reaction vessel, 270 parts of COSMONATE M-200 (trade name, crude MDI manufactured by Mitsui Chemicals, Inc.; NCO group content, 31.3%) and 127 parts of methyl isobutyl ketone were placed and heated to 70° C. Into the resulting product, 236 parts of ethylene glycol monobutyl ether was added dropwise over 1 hour, and then the temperature was raised to 100° C. While maintaining this temperature, sampling was carried out over time to confirm that absorption of unreacted isocyanate groups were not observed by infrared absorption spectrometry, thereby obtaining a blocked polyisocyanate compound (BNCO (B1)) having a resin solid content of 80%.

<Production of Acrylic Resin>

(Acrylic Resin No. 1)

A reaction vessel equipped with a stirrer, a condenser, a nitrogen inlet tube, a thermometer, and a dropping funnel was charged with 50 parts of methyl isobutyl ketone, and heated and held at 110° C. in a nitrogen atmosphere.

Furthermore, the following monomer mixture was added dropwise from a dropping funnel over 3 hours, after which 0.5 parts of t-butyl peroctoate was further added dropwise, and the mixture was held at 110° C. for 1.5 hours. Subsequently, methyl isobutyl ketone was added to adjust the solid content to 50%, thereby obtaining an acrylic resin No. 1 solution. The acrylic resin No. 1 obtained had a weight-average molecular weight of 12,000, an amine value of 71 mgKOH/g, a hydroxyl value of 43 mgKOH/g, and a solubility parameter of 10.5.

(Monomer Mixture)

Methyl methacrylate: 65 parts
2-Ethylhexyl methacrylate: 5 parts
2-Hydroxyethyl methacrylate: 10 parts
N,N-Dimethylaminoethyl methacrylate: 20 parts
t-Butyl peroctoate: 4 parts (Acrylic Resin No. 2)

A reaction vessel equipped with a stirrer, a condenser, a nitrogen inlet tube, a thermometer, and a dropping funnel was charged with 50 parts of methyl isobutyl ketone, and heated and held at 110° C. in a nitrogen atmosphere.

Furthermore, the following monomer mixture was added dropwise from a dropping funnel over 3 hours, after which 0.5 parts of t-butyl peroctoate was further added dropwise, and the mixture was held at 110° C. for 1.5 hours. Subsequently, methyl isobutyl ketone was added to adjust the solid content to 50%, thereby obtaining an acrylic resin No. 2 solution. The acrylic resin No. 2 obtained had a weight-average molecular weight of 12,000, an amine value of 71 mgKOH/g, a hydroxyl value of 43 mgKOH/g, and a solubility parameter of 10.1.

(Monomer Mixture)

Methyl methacrylate: 30 parts
2-Ethylhexyl methacrylate: 35 parts
2-Hydroxyethyl methacrylate: 10 parts
N,N-Dimethylaminoethyl methacrylate: 20 parts
t-Butyl peroctoate: 4 parts (Acrylic Resin No. 3)

A reaction vessel equipped with a stirrer, a condenser, a nitrogen inlet tube, a thermometer, and a dropping funnel was charged with 50 parts of methyl isobutyl ketone, and heated and held at 110° C. in a nitrogen atmosphere.

Furthermore, the following monomer mixture was added dropwise from a dropping funnel over 3 hours, after which 0.5 parts of t-butyl peroctoate was further added dropwise, and the mixture was held at 110° C. for 1.5 hours. Subsequently, methyl isobutyl ketone was added to adjust the solid content to 50%, thereby obtaining an acrylic resin No. 3 solution. The acrylic resin No. 3 obtained had a weight-average molecular weight of 12,000, an amine value of 71 mgKOH/g, a hydroxyl value of 43 mgKOH/g, and a solubility parameter of 9.7.

(Monomer Mixture)

Methyl methacrylate: 5 parts
2-Ethylhexyl methacrylate: 65 parts
2-Hydroxyethyl methacrylate: 10 parts
N,N-Dimethylaminoethyl methacrylate: 20 parts
t-Butyl peroctoate: 4 parts

Example 2-1

One hundred parts (solid content) of the amino-containing epoxy resin (A-2) obtained in Example 1-1 and 30 parts (solid content) of the blocked polyisocyanate compound (BNCO) (B1) were mixed together, and 13 parts of 10% acetic acid was further added to the mixture and uniformly stirred, after which deionized water was added dropwise with vigorous stirring over about 15 minutes to obtain an emulsion having a solid content of 34%.

Next, 52.4 parts of the pigment-dispersed paste (P1) and deionized water were added to 294 parts (solid content: 100 parts) of the emulsion to produce a cationic electrodeposition paint (X-2) having a solid content of 20%. The average concentration of polyfunctionalization (Y2) of the cationic electrodeposition paint (X-2) is shown in Table 2.

Using the cationic electrodeposition paint obtained, electrodeposition and heat curing were performed to obtain an electrodeposition coating film. The electrodeposition coating film obtained was evaluated for surface finish, corrosion resistance (salt spray), corrosion resistance (salt immersion), and oil crawling resistance. The results are listed in Table 2.

Examples 2-2 to 2-21 and Comparative Examples 2-1 to 2-5

Cationic electrodeposition paints (X-2) to (X-26) having average concentrations of polyfunctionalization (Y2) shown in Table 2 to Table 4 and a solid content of 20% were produced in the same manner as in Example 2-1 except that the amino-containing epoxy resins and the pigment-dispersed pastes shown in Table 2 to Table 4 were used. Example 2-12 is an example in which 15 parts of A-5 and 85 parts of A-18 are used as the amino-containing epoxy resins, and Example 2-13 is an example in which 40 parts of A-5 and 60 parts of A-18 are used as the amino-containing epoxy resins. The average concentrations of polyfunctionalization (Y2) of Examples 2-12 and 2-13 are each calculated as an average of the two mixed epoxy resins and expressed in units of mmol/g.

Similarly, the cationic electrodeposition paints of Example 2-18 to 2-21 and Comparative Example 2-5 each contain the amino-containing epoxy resin (A-5) and any one of the acrylic resins Nos. 1 to 3.

Using the cationic electrodeposition paints obtained, electrodeposition and heat curing were performed to obtain electrodeposition coating films.

Sections of the electrodeposition coating films were observed, and all were found to be single-layer coating films (no boundaries).

The electrodeposition coating films obtained were evaluated for surface finish, corrosion resistance (salt spray), corrosion resistance (salt immersion), and oil crawling resistance. The results are listed in Table 2 to Table 4.

In the present invention, coating films evaluated as unacceptable "C" in at least one of the four evaluations are unacceptable.

The values of resin contents in the tables are all in terms of solid content.

TABLE 2

| | Example (paint) | | | | | |
|---|---|---|---|---|---|---|
| | Comparative Example 2-1 | Example 2-1 | Example 2-2 | Example 2-3 | Example 2-4 | Example 2-5 |
| Paint composition | X-1 | X-2 | X-3 | X-4 | X-5 | X-6 |
| Amino-containing | A-1 | A-2 | A-3 | A-4 | A-5 | A-5 |
| epoxy resin | 100 | 100 | 100 | 100 | 100 | 100 |
| Curing agent (BNCO) | 45 | 45 | 45 | 45 | 45 | 45 |
| Pigment-dispersed paste (P1) | P1 | P1 | P1 | P1 | P1 | |
| Pigment-dispersed paste (P2) | | | | | | P2 |
| Average concentration of polyfunctionalization (Y2) | 0.101 | 0.202 | 0.407 | 0.533 | 0.858 | 0.858 |
| Surface finish | S | S | S | S | S | S |
| Corrosion resistance (salt spray) | A | S | S | S | S | S |
| Corrosion resistance (salt immersion) | B | A | A | S | S | S |
| Oil crawling resistance | C | B | A | A | S | S |

| | Example (paint) | | | | | |
|---|---|---|---|---|---|---|
| | Example 2-6 | Example 2-7 | Example 2-8 | Example 2-9 | Example 2-10 | Example 2-11 |
| Paint composition | X-7 | X-8 | X-9 | X-10 | X-11 | X-12 |
| Amino-containing | A-6 | A-7 | A-8 | A-9 | A-10 | A-11 |
| epoxy resin | 100 | 100 | 100 | 100 | 100 | 100 |
| Curing agent (BNCO) | 45 | 45 | 45 | 45 | 45 | 45 |
| Pigment-dispersed paste (P1) | P1 | P1 | P1 | P1 | P1 | P1 |
| Pigment-dispersed paste (P2) | | | | | | |
| Average concentration of polyfunctionalization (Y2) | 0.939 | 1.032 | 1.129 | 1.087 | 1.179 | 1.214 |
| Surface finish | S | S | S | A | B1 | B2 |
| Corrosion resistance (salt spray) | S | S | S | S | S | S |
| Corrosion resistance (salt immersion) | S | S | S | S | S | S |
| Oil crawling resistance | S | S | S | S | S | S |

TABLE 3

| | Example (paint) | | | | | | |
|---|---|---|---|---|---|---|---|
| | Example 2-12 | | Example 2-13 | | Example 2-14 | Example 2-15 | Comparative Example 2-2 |
| Paint composition | X-13 | | X-14 | | X-15 | X-16 | X-17 |
| Amino-containing epoxy | A-5 | A-18 | A-5 | A-18 | A-12 | A-13 | A-14 |
| resin | 15 | 85 | 40 | 60 | 100 | 100 | 100 |
| Curing agent (BNCO) | 45 | | 45 | | 45 | 45 | 45 |
| Pigment-dispersed paste (P1) | P1 | | P1 | | P1 | P1 | P1 |
| Pigment-dispersed paste (P2) | | | | | | | |
| Average concentration of polyfunctionalization (Y2) | 0.129 | | 0.343 | | 0.677 | 0.592 | 0.121 |
| Surface finish | S | | S | | S | S | S |

TABLE 3-continued

| | | | | | |
|---|---|---|---|---|---|
| Corrosion resistance (salt spray) | S | S | S | S | A |
| Corrosion resistance (salt immersion) | A | S | S | S | B |
| Oil crawling resistance | B | B | S | S | C |

| | Example (paint) | | | |
|---|---|---|---|---|
| | Example 2-16 | Comparative Example 2-3 | Example 2-17 | Comparative Example 2-4 |
| Paint composition | X-18 | X-19 | X-20 | X-21 |
| Amino-containing epoxy resin | A-15<br>100 | A-16<br>100 | A-17<br>100 | A-18<br>100 |
| Curing agent (BNCO) | 45 | 45 | 45 | 45 |
| Pigment-dispersed paste (P1) | P1 | P1 | P1 | P1 |
| Pigment-dispersed paste (P2) | | | | |
| Average concentration of polyfunctionalization (Y2) | 2.133 | 0.115 | 0.986 | 0.000 |
| Surface finish | A | S | S | S |
| Corrosion resistance (salt spray) | S | A | S | A |
| Corrosion resistance (salt immersion) | S | B | S | C |
| Oil crawling resistance | S | C | S | C |

TABLE 4

| Example (paint) | Example 2-18 | Example 2-19 | Example 2-20 | Example 2-21 | Comparative Example 2-5 |
|---|---|---|---|---|---|
| Paint composition | X-22 | X-23 | X-24 | X-25 | X-26 |
| Amino-containing epoxy resin/acrylic resin | A-5 / Acrylic 1<br>95 / 5 | A-5 / Acrylic 1<br>80 / 20 | A-5 / Acrylic 2<br>80 / 20 | A-5 / Acrylic 3<br>80 / 20 | A-5 / Acrylic 1<br>65 / 35 |
| Curing agent (BNCO) | 45 | 45 | 45 | 45 | 45 |
| Pigment P1 (bismuth) | P1 | P1 | P1 | P1 | P1 |
| Pigment P2 (tin compound) | | | | | |
| Average concentration of polyfunctionalization (Y2) | 0.858 | 0.858 | 0.858 | 0.858 | 0.858 |
| Surface finish | S | A | B1 | B2 | B1 |
| Corrosion resistance (salt spray) | S | A | A | A | B |
| Corrosion resistance (salt immersion) | A | B | B | B | C |
| Oil crawling resistance | S | A | A | A | B |

(Note)
"Acrylic 1", "Acrylic 2", and "Acrylic 3" in the table refer to the acrylic resins Nos. 1 to 3, respectively.

The evaluations of surface finish, corrosion resistance (salt spray), corrosion resistance (salt immersion), and oil crawling resistance were carried out as described below. Coating films (paints) evaluated as "C" in at least one item are unacceptable.

(Surface Finish)

A cold-rolled steel sheet (0.8 mm×150 mm×70 mm) treated with zinc phosphate was subjected to electrodeposition at a bath temperature of 28° C. and a load voltage at which the thickness of a cured coating film would be 20 μm, and heat curing was performed at 170° C. for 20 minutes to obtain a test sheet. Subsequently, the coated surface of the test sheet was measured for a surface roughness value (Ra) defined in JIS B 601 with a cutoff of 0.8 mm using SURFTEST 301 (trade name, surface roughness meter manufactured by Mitutoyo Corporation) and evaluated according to the following criteria. S is the best rating, and C is unacceptable.

S: The surface roughness value (Ra) is less than 0.15.

A: The surface roughness value (Ra) is 0.15 or more and less than 0.25.

B1: The surface roughness value (Ra) is 0.25 or more and less than 0.35.

B2: The surface roughness value (Ra) is 0.35 or more and less than 0.45.

C: The surface roughness value (Ra) is 0.45 or more.

(Corrosion Resistance (Salt Spray))

A cold-rolled steel sheet (0.8 mm×150 mm×70 mm) treated with zinc phosphate was subjected to electrodeposition at a bath temperature of 28° C. and a load voltage at which the thickness of a cured coating film would be 20 μm, and heat curing was performed at 170° C. for 20 minutes to obtain a test sheet. Subsequently, the coating film was cross-cut with a cutter knife such that the cutter knife reached the substrate of the test sheet and subjected to a salt spray test at 35° C. for 840 hours in accordance with JIS Z-2371, and evaluation was performed based on rust and blister widths on one side of the cut portion according to the following evaluation criteria. S is the best rating, and C is unacceptable.

S: The maximum width of rust and blisters is 2.0 mm or less on one side of the cut portion; very high corrosion resistance.

A: The maximum width of rust and blisters is more than 2.0 mm and 3.0 mm or less on one side of the cut portion; good corrosion resistance.

B: The maximum width of rust and blisters is more than 3.0 mm and 4.0 mm or less on one side of the cut portion; standard corrosion resistance.

C: The maximum width of rust and blisters is more than 4.0 mm on one side of the cut portion; poor corrosion resistance.

(Corrosion Resistance (Salt Immersion))

A cold-rolled steel sheet (0.8 mm×150 mm×70 mm) treated with zinc phosphate was subjected to electrodeposition at a bath temperature of 28° C. and a load voltage at which the thickness of a cured coating film would be 20 μm, and heat curing was performed at 170° C. for 20 minutes to obtain a test sheet. Subsequently, after the test sheet was immersed in 50° C. salt water with a concentration of 5 wt % for 600 hours, the test sheet was pulled up, and water on the coating film surface was wiped off. Cellophane adhesive tape was then closely adhered to the coating film surface, and the tape was quickly peeled off. The percentage (%) of peeled coating film was evaluated by this peeling test. S is the best rating, and C is unacceptable.

S: The percentage of peeled coating film to the testing coating film portion is less than 5%.

A: The percentage of peeled coating film to the testing coating film portion is 5% or more and less than 10%.

B: The percentage of peeled coating film to the testing coating film portion is 10% or more and less than 20%.

C: The percentage of peeled coating film to the testing coating film portion is 20% or more.

(Oil Crawling Resistance)

A cold-rolled steel sheet (0.8 mm×150 mm×70 mm) treated with zinc phosphate was subjected to electrodeposition at a bath temperature of 28° C. and a load voltage at which the thickness of a cured coating film would be 20 μm, thereby obtaining a wet film.

The wet film was washed with water and left to stand for 30 minutes, and 0.2 ml of rust preventive machine oil (manufactured by Nihon Parkerizing Co., Ltd., trade name: NOX-RUST320) was then uniformly scattered and adhered in a baking process. After cooling, the coating film surface was visually observed, and the number and size of craters were counted and evaluated according to the following evaluation criteria. S is the best rating, and C is unacceptable.

S: No craters occur on a coating film surface.

A: Less than 10 craters occur on a coating film surface.

B: Ten or more craters (each having a diameter of less than 2 mm) occur on a coating film surface.

C: Ten or more craters (one or more of which having a diameter of 2 mm or more) occur on a coating film surface.

While the present invention has been described in detail above with reference to embodiments and Examples, the present invention is not limited to the above-described embodiments and Examples, and various modifications based on the technical idea of the present invention are possible.

In the present invention, compounds (polyfunctionalizing agent α and polyfunctionalizing agent β) represented by structural formula (A) where "p=q=r=0, and $R_1=R_2=R_3=H$" are used as polyfunctionalizing agents in Examples, but, for example, a compound represented by structural formula (A) where "p=q=r=1, and $R_1=R_2=R_3$=methyl (—$CH_3$)" has also been confirmed to have comparable performance and can be suitably used.

The invention claimed is:

1. An amino-containing epoxy resin obtained by reacting a first epoxy resin and an amine compound, said first epoxy resin being obtained, without a dimer acid diglycidyl ester, by reacting at least:

a compound having two or more epoxy groups; and a compound having a functional group that reacts with the epoxy groups, wherein the amino-containing epoxy resin has an average degree of polyfunctionalization (X2), as expressed by Formula (3) below, of 0.60 to 13.0:

Formula (3): Average degree of polyfunctionalization (X2)=number of ends in one molecule of amino-containing epoxy resin−2, wherein the compound having two or more epoxy groups is comprised of:

an epoxy compound represented by Formula (D):

(D)

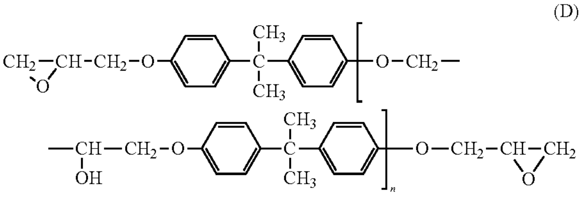

where n is 0 to 8; and/or an epoxy compound obtained by reaction of polyphenol compounds and epihalohydrin, wherein the first epoxy resin satisfies conditions (I) and/or (II) below:

(I) the compound having a functional group that reacts with the epoxy groups comprises a trihydric or higher phenol compound and/or a compound including a trifunctional or higher polyisocyanate, wherein the trihydric or higher phenol compound includes a compound represented by structural formula (A) below:

(A)

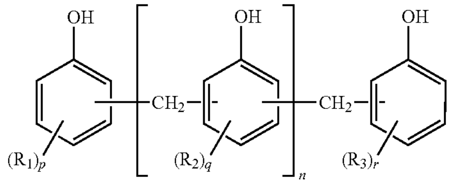

where n is an integer of 1 to 20, p is an integer of 0 to 4, q is an integer of 0 to 3, and r is an integer of 0 to 4; $R_1$ to $R_3$ are each independently a monovalent group; $R_2$'s in n repeating units may be different from each other; when a plurality of $R_1$'s, $R_2$'s, and/or $R_3$'s are present in aromatic rings, the plurality of $R_1$'s, $R_2$'s, and/or $R_3$'s may be the same or different from each other; and $R_1$ to $R_3$ may be bonded to each other to form a ring, (II) the first epoxy resin has an average degree of polyfunctionalization (X1) per molecule, as expressed by Formula (1) below, of 0.60 to 13.0:

Average degree of polyfunctionalization (X1)=number of ends per molecule of epoxy resin−2, Formula (1):

wherein the number of ends per molecule of epoxy resin refers to the number of ends having an epoxy group or a functional group that reacts with the epoxy group in one molecule of the first epoxy resin, which is the number of functional group-containing molecular ends resulting from branching of a main chain of the first epoxy resin in which an epoxy group of the compound having two or more epoxy groups and a secondary hydroxyl group of another compound having two or more epoxy groups are reacted with each other.

2. The amino-containing epoxy resin according to claim 1, wherein the first epoxy resin has an average concentration of polyfunctionalization (Y1), as expressed by Formula (2) below, of 0.10 or more, Average concentration of polyfunctionalization (*Y*1) =average degree of polyfunctionalization (*X*1) of epoxy resin: weight-average molecular weight Mw of epoxy resin×1000. Formula (2):

3. The amino-containing epoxy resin according to claim 1, wherein the condition (I) is satisfied, and the first epoxy resin is obtained by further reacting a compound having one or more active hydrogens in one molecule that is other than the trihydric or higher phenol compound.

4. The amino-containing epoxy resin according to claim 1, wherein the first epoxy resin is obtained by reacting, together with the trihydric or higher phenol compound, a compound represented by structural formula (B) below:

(B)

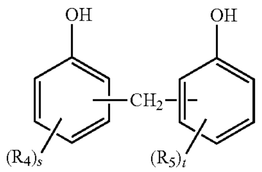

where s is an integer of 0 to 4, and t is an integer of 0 to 4; $R_4$ and $R_5$ are each independently a monovalent group; when a plurality of $R_4$'s and/or $R_5$'s are present in aromatic rings, the plurality of $R_4$'s and/or $R_4$'s may be the same or different from each other; and $R_4$ and/or $R_5$ may be bonded to each other to form a ring, wherein a content ratio (mass ratio) of the trihydric or higher phenol compound to the compound represented by structural formula (B) is in a range of 1/99 to 99/1.

5. The amino-containing epoxy resin according to claim 1, wherein the trifunctional or higher polyisocyanate comprises isocyanurate isocyanate and/or polymethylene polyphenyl isocyanate represented by structural formula (C) below:

(C)

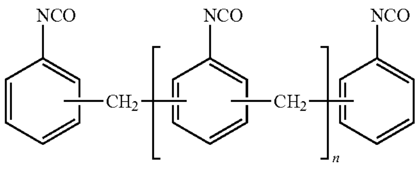

where n is an integer of 1 or greater.

6. An aqueous resin dispersion comprising the amino-containing epoxy resin according to claim 1 dispersed in an aqueous medium.

7. A cationic electrodeposition paint comprising the amino-containing epoxy resin according to claim 1, and a curing agent.

8. The cationic electrodeposition paint according to claim 7, wherein the compound having two or more epoxy groups is a compound not modified with amine.

9. The cationic electrodeposition paint according to claim 7, further comprising an acrylic resin, wherein a content of the acrylic resin is less than 30 mass % based on a total amount of all the epoxy resin and the acrylic resin taken as 100 mass %, and an absolute value of a difference in SP value between the acrylic resin and the epoxy resin is less than 1.0.

10. A method for producing the cationic electrodeposition paint according to claim 7, the method comprising:

a step of producing an amino-containing epoxy resin by reacting an amine compound with an epoxy resin obtained by reacting at least a compound having two or more epoxy groups and a trihydric or higher phenol compound and/or a compound including a trifunctional or higher polyisocyanate, the trihydric or higher phenol compound being not a xylene formaldehyde resin; and a step of mixing the amino-containing epoxy resin and a curing agent to produce a cationic electrodeposition paint.

11. The method for producing the cationic electrodeposition paint according to claim 10, wherein the compound having two or more epoxy groups is a compound not modified with amine, and the cationic electrodeposition paint to be produced is a single-layer cationic electrodeposition paint.

12. A painted article obtained by immersing a coating target in an electrodeposition paint bath containing the cationic electrodeposition paint according to claim 7 and performing electrodeposition.

13. A single-layer cationic electrodeposition paint comprising:

the amino-containing epoxy resin according to claim 1; and a curing agent.

14. The cationic electrodeposition paint according to claim 13, wherein the first epoxy resin used for the amino-containing epoxy resin is obtained by reacting at least the compound having two or more epoxy groups, the compound including a trihydric or higher phenol compound, and a compound having one or more active hydrogens in one molecule that is other than the trihydric or higher phenol compound.

15. The cationic electrodeposition paint according to claim 14, wherein the compound having one or more active hydrogens in one molecule that is other than the trihydric or higher phenol compound is a compound represented by structural formula (B) below:

(B)

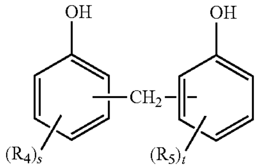

where s is an integer of 0 to 4, and tis an integer of 0 to 4; $R_4$ and $R_5$ are each independently a monovalent group; when a plurality of $R_4$'s and/or $R_5$'s are present in aromatic rings, the plurality of $R_4$'s and/or $R_5$'s may be the same or different from each other; and $R_4$ and/or $R_5$ may be bonded to each other to form a ring, and a content ratio by mass of the trihydric or higher phenol compound to the compound represented by structural formula (B) is in a range of 1/99 to 99/1.

16. The cationic electrodeposition paint according to claim 13, wherein the trifunctional or higher polyisocyanate comprises isocyanurate isocyanate and/or polymethylene polyphenyl isocyanate represented by structural formula (C) below:

(C)

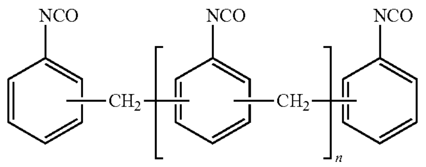

where n is an integer of 1 or greater.

17. A cationic electrodeposition paint comprising:

the amino-containing epoxy resin according to claim 1; and a curing agent, wherein a content of the amino-containing epoxy resin is 71 mass % or more based on 100 mass % of resin components other than the curing agent.

18. The amino-containing epoxy resin according to claim 1, wherein the compound having two or more epoxy groups consists of:

the epoxy compound represented by Formula (D); and/or the epoxy compound obtained by reaction of polyphenol compounds and epihalohydrin.

* * * * *